(12) United States Patent
Miyamae et al.

(10) Patent No.: US 10,166,477 B2
(45) Date of Patent: Jan. 1, 2019

(54) IMAGE PROCESSING DEVICE, IMAGE PROCESSING METHOD, AND IMAGE PROCESSING PROGRAM

(71) Applicant: Sony Interactive Entertainment Inc., Tokyo (JP)

(72) Inventors: Yuki Miyamae, Tokyo (JP); Masafumi Noda, Tokyo (JP); Takumi Yoshida, Tokyo (JP); Keiichiro Ishihara, Tokyo (JP); Gento Morita, Tokyo (JP); Yutaka Yokokawa, Kanagawa (JP); Nicolas Doucet, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/312,495

(22) PCT Filed: Mar. 13, 2015

(86) PCT No.: PCT/JP2015/057571
§ 371 (c)(1),
(2) Date: Nov. 18, 2016

(87) PCT Pub. No.: WO2015/186401
PCT Pub. Date: Dec. 10, 2015

(65) Prior Publication Data
US 2017/0113142 A1    Apr. 27, 2017

(30) Foreign Application Priority Data

Jun. 6, 2014  (JP) .................................. 2014-117813
Jun. 6, 2014  (JP) .................................. 2014-117814

(51) Int. Cl.
*A63F 13/655*   (2014.01)
*A63F 13/428*   (2014.01)
(Continued)

(52) U.S. Cl.
CPC ............ *A63F 13/655* (2014.09); *A63F 13/20* (2014.09); *A63F 13/213* (2014.09); *A63F 13/25* (2014.09);
(Continued)

(58) Field of Classification Search
None
See application file for complete search history.

(56) References Cited

U.S. PATENT DOCUMENTS 9,240,077 B1 *  1/2016  Kraft ..................... G06T 19/006
2010/0079491 A1 *  4/2010  Nonaka .................. G06T 11/00
                                                    345/630

(Continued)

FOREIGN PATENT DOCUMENTS

EP    2372653 A1    10/2011
JP    2003125361 A   4/2003
(Continued)

OTHER PUBLICATIONS

International Preliminary Report on Patentability and Written Opinion for corresponding PCT Application No. PCT/JP2015/057571, 14 pages, dated Dec. 15, 2016.

(Continued)

*Primary Examiner* — James S McClellan
*Assistant Examiner* — Peter Iannuzzi
(74) *Attorney, Agent, or Firm* — Matthew B. Dernier, Esq.

(57) ABSTRACT

A game device includes: a detecting section configured to obtain an imaged image imaged by an imaging device, and detect a tracking object included in the obtained imaged image; a control section configured to calculate a position in which to display a predetermined image according to a position in which the tracking object is detected; and an image generating section configured to generate a display (Continued)

image displaying the predetermined image in the position calculated by the control section in the imaged image such that the predetermined image is superimposed on the imaged image, and display the generated display image on a display device.

9 Claims, 23 Drawing Sheets

(51) Int. Cl.
| | | |
|---|---|---|
| G06F 3/01 | (2006.01) | |
| G06K 9/78 | (2006.01) | |
| G06T 19/00 | (2011.01) | |
| H04N 5/262 | (2006.01) | |
| A63F 13/20 | (2014.01) | |
| A63F 13/25 | (2014.01) | |
| A63F 13/35 | (2014.01) | |
| A63F 13/52 | (2014.01) | |
| G06T 7/246 | (2017.01) | |
| G06K 9/00 | (2006.01) | |
| G06T 5/00 | (2006.01) | |
| G06T 19/20 | (2011.01) | |
| A63F 13/65 | (2014.01) | |
| A63F 13/213 | (2014.01) | |
| A63F 13/5372 | (2014.01) | |

(52) U.S. Cl.
CPC ............ *A63F 13/35* (2014.09); *A63F 13/428* (2014.09); *A63F 13/52* (2014.09); *A63F 13/5372* (2014.09); *A63F 13/65* (2014.09); *G06F 3/012* (2013.01); *G06K 9/00255* (2013.01); *G06K 9/78* (2013.01); *G06T 5/002* (2013.01); *G06T 5/006* (2013.01); *G06T 7/246* (2017.01); *G06T 19/00* (2013.01); *G06T 19/20* (2013.01); *H04N 5/262* (2013.01); *G06T 2207/10004* (2013.01); *G06T 2207/30201* (2013.01); *G06T 2219/2016* (2013.01)

(56) References Cited

U.S. PATENT DOCUMENTS

| | | | |
|---|---|---|---|
| 2010/0105475 A1 | 4/2010 | Mikhailov | |
| 2011/0234879 A1 | 9/2011 | Kashitani | |
| 2015/0123967 A1* | 5/2015 | Quinn | ................... G06T 13/40 345/420 |

FOREIGN PATENT DOCUMENTS

| | | |
|---|---|---|
| JP | 2005319191 A | 11/2005 |
| JP | 2008040864 A | 2/2008 |
| JP | 2010086178 A | 4/2010 |
| WO | 2010121354 A1 | 10/2010 |
| WO | 2013145536 A1 | 10/2013 |

OTHER PUBLICATIONS

International Search Report for corresponding PCT Application No. PCT/JP2015/057571, 4 pages, dated May 26, 2015.
Extended European Search Report for corresponding EP Application No. 15803085.8, 11 pages, dated Jan. 25, 2018.

* cited by examiner

FIG.2
(a)
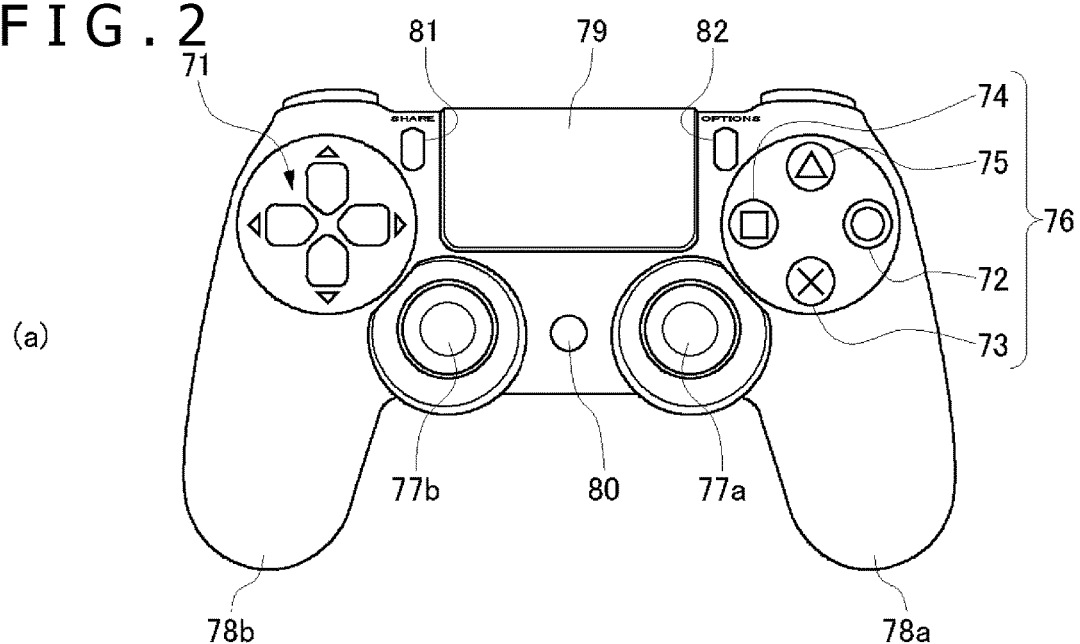
(b)
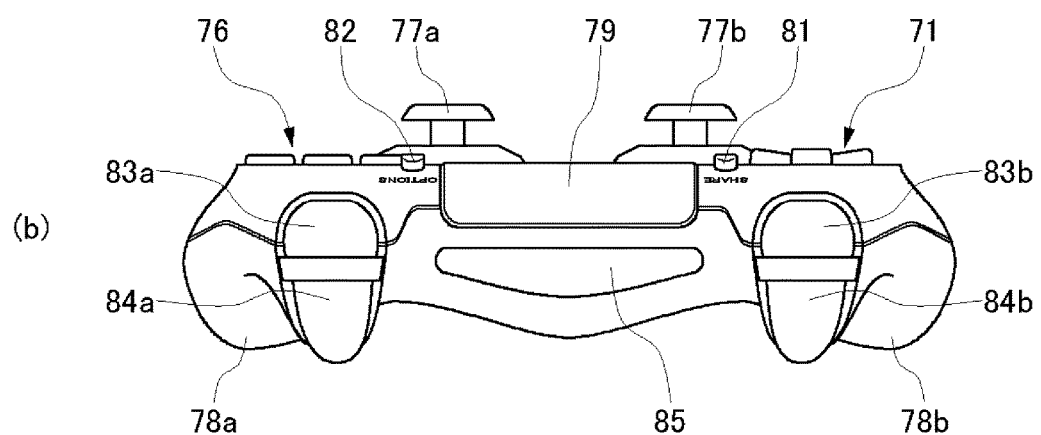

IMAGE PROCESSING DEVICE, IMAGE PROCESSING METHOD, AND IMAGE PROCESSING PROGRAM

TECHNICAL FIELD

The present invention relates to an image processing technology, and particularly to an image processing device, an image processing method, and an image processing program that process an imaged image.

BACKGROUND ART

Games using an actually photographed image imaged by an imaging device are provided. A user can enjoy game play while viewing an image in which the surroundings of the user are imaged.

SUMMARY

Technical Problem

The present inventor et al. have conceived a new technology for improving entertainingness in a game using such an actually photographed image.

The present invention has been made in view of such a situation. It is an object of the present invention to provide a more entertaining game.

Solution to Problem

In order to solve the above problem, according to a mode of the present invention, there is provided an image processing device including: a detecting section configured to obtain an imaged image imaged by an imaging device, and detect a tracking object included in the obtained imaged image; a control section configured to calculate a position in which to display a predetermined image according to a position in which the tracking object is detected; and a generating section configured to generate a display image displaying the predetermined image in the position calculated by the control section in the imaged image such that the predetermined image is superimposed on the imaged image, and display the generated display image on a display device.

It is to be noted that arbitrary combinations of the above constituent elements as well as modes obtained by converting expressions of the present invention between a method, a device, a system, and the like are also effective as modes of the present invention.

Advantageous Effect of Invention

According to the present invention, it is possible to provide a more entertaining game.

BRIEF DESCRIPTION OF DRAWINGS

FIG. 2(a) is a diagram showing an external constitution of an upper surface of an input device, and FIG. 2(b) is a diagram showing an external constitution of a side surface on a back side of the input device.

DESCRIPTION OF EMBODIMENT

Figure 1:
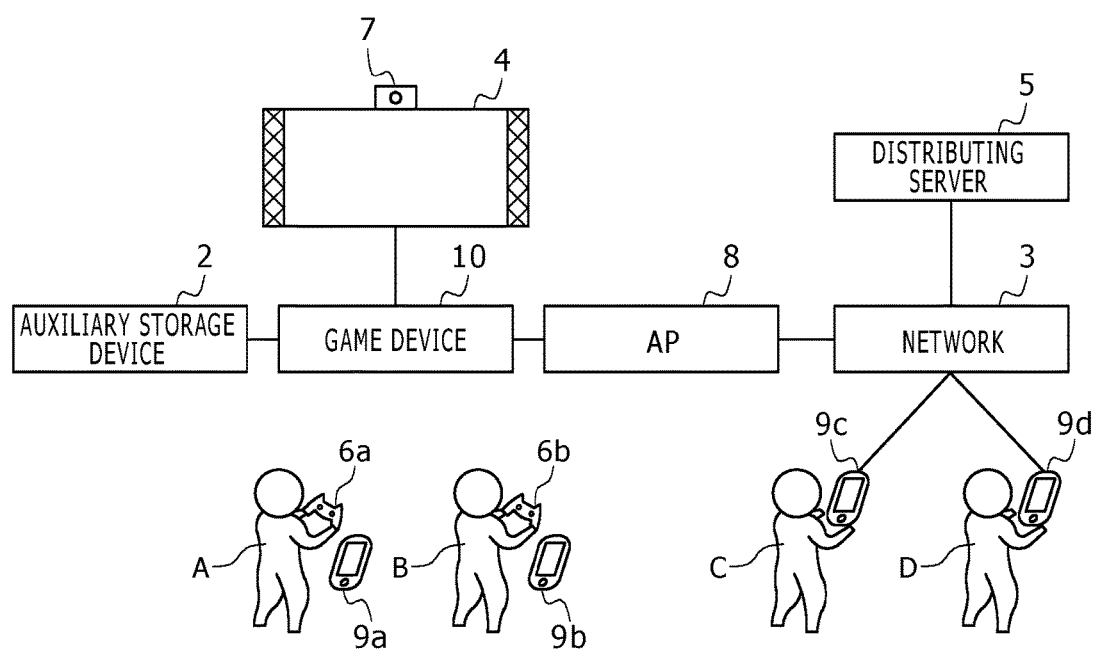
FIG. 1 is a diagram showing a game system according to an embodiment of the present invention.

FIG. 1 shows a configuration of a game system 1 according to an embodiment of the present invention. The game system 1 includes a game device 10, input devices 6a and 6b operated by users of the game device 10, and portable terminal devices 9a and 9b operated by the users of the game device 10. The game device 10 is communicatably connected to a distributing server 5, portable terminal devices 9c and 9d of other users, and the like connected to an external network 3 via an AP (Access Point) 8. A plurality of users can log in to the game device 10 at the same time.

An auxiliary storage device 2 is a mass storage device such as an HDD (Hard Disk Drive), a flash memory, or the like. The auxiliary storage device 2 may be an external storage device connected to the game device 10 by a USB (Universal Serial Bus) or the like, or may be an internal storage device. An output device 4 may be a television set including a display for outputting an image and a speaker for outputting sound. The game device 10 is connected to the input device 6 operated by the user by wireless or by wire. The input device 6 outputs operation information indicating a result of operation of the user to the game device 10. The game device 10 is further connected to the portable terminal device 9 operated by the user by wireless or by wire. The portable terminal device 9 transmits, to the game device 10, operation information indicating a result of operation of the user, data to be used by a game program or the like executed in the game device 10, or the like. When the game device 10 receives the operation information from the input device 6 or the portable terminal device 9, the game device 10 reflects the operation information in the processing of an OS (Operating System; system software), the game program, or the like, and makes a result of the processing output from the output device 4.

A camera 7 as an imaging device is provided in the vicinity of the output device 4. The camera 7 images a space around the output device 4. FIG. 1 shows an example in which the camera 7 is attached to an upper portion of the output device 4. However, the camera 7 may be disposed on a side of the output device 4. In either case, the camera 7 is disposed in such a position as to be able to image a user playing a game in front of the output device 4. Incidentally, the camera 7 may be a stereo camera, or may be a range finding camera.

The input device 6 may be a game controller that provides user operation information to the game device 10. The game controller includes a plurality of input units such as a plurality of push type operating buttons, an analog stick allowing an analog quantity to be input, a rotary button, and the like.

The portable terminal device 9 may be a portable information terminal such as a smart phone, a tablet, or the like, or may be a portable game device. The portable terminal device 9 executes an application for transmitting user operation information, game data, and the like to the game program executed in the game device 10.

The game device 10 according to the present embodiment has functions of providing a game using an actually photographed image of surroundings of the user, which photographed image is imaged by the camera 7, and distributing the screen of the game being played by the user to other users. When the game device 10 receives an instruction to distribute the screen of a game from a user A or B while the users A and B are playing the game, the game device 10 uploads data of the screen of the game to the distributing server 5 via the network 3. Users C and D can access the distributing server 5 via the network 3 using the portable terminal device 9, the game device 10, a personal computer, or the like, and view the distributed moving image of the game. The moving image of the game may be distributed by streaming from the distributing server, or the moving image stored in the distributing server may be distributed by download.

A button configuration of the input device 6 will be described.

Constitution of Upper Surface Portion

FIG. 2(a) shows an external constitution of an upper surface of the input device. The user operates the input device 6 while holding a left grip portion 78b with a left hand and holding a right grip portion 78a with a right hand. The upper surface of a casing of the input device 6 is provided with a direction key 71, analog sticks 77a and 77b, and four kinds of operating buttons 76 as input portions. The four kinds of buttons 72 to 75 are marked with different figures of different colors so as to be distinguished from one another. Specifically, the circle button 72 is marked with a red circle, the cross button 73 is marked with a blue cross, the square button 74 is marked with a purple square, and the triangle button 75 is marked with a green triangle. A touch pad 79 is provided in a flat region between the direction key 71 and the operating buttons 76 on the upper surface of the casing. The touch pad 79 also functions as a depression type button that sinks downward when pressed by the user and which returns to an original position when released by the user.

A function button 80 is provided between the two analog sticks 77a and 77b. The function button 80 is used to turn on power to the input device 6 and simultaneously activate a communication function that connects the input device 6 and the game device 10 to each other. After the input device 6 is connected to the game device 10, the function button 80 is also used to display a menu screen on the game device 10.

A SHARE button 81 is provided between the touch pad 79 and the direction key 71. The SHARE button 81 is used to input an instruction from the user to the OS or the system software in the game device 10. In addition, an OPTIONS button 82 is provided between the touch pad 79 and the operating buttons 76. The OPTIONS button 82 is used to input an instruction from the user to an application (game) executed in the game device 10. The SHARE button 81 and the OPTIONS button 82 may each be formed as a push type button.

Constitution of Side Surface Portion on Back Side

FIG. 2(b) shows an external constitution of a side surface on the back side of the input device. On the upper side of the side surface on the back side of the casing of the input device 6, the touch pad 79 is extended from the upper surface of the casing. A horizontally long light emitting portion 85 is provided on the lower side of the side surface on the back side of the casing. The light emitting portion 85 has an R (red) LED (Light Emitting Diode), a G (green) LED, and a B (blue) LED. The light emitting portion 85 illuminates according to light emission color information transmitted from the game device 10.

On the side surface on the back side of the casing, an upper side button 83a, a lower side button 84a, an upper side button 83b, and a lower side button 84b are disposed at left and right positions symmetric in a longitudinal direction.

The upper side button 83a and the lower side button 84a are operated by the index finger and the middle finger, respectively, of the right hand of the user. The upper side button 83b and the lower side button 84b are operated by the index finger and the middle finger, respectively, of the left hand of the user. As shown in the figure, the light emitting portion 85 is disposed between the line of the upper side button 83a and the lower side button 84a on the right side and the line of the upper side button 83b and the lower side button 84b on the left side. Therefore, the light emitting portion 85 is not hidden by the index fingers or the middle fingers operating the respective buttons. The camera 7 can thus image the illuminating light emitting portion 85 ideally. The upper side button 83 may be configured as a push type button. The lower side button 84 may be configured as a rotatably supported trigger type button.

Figure 3:
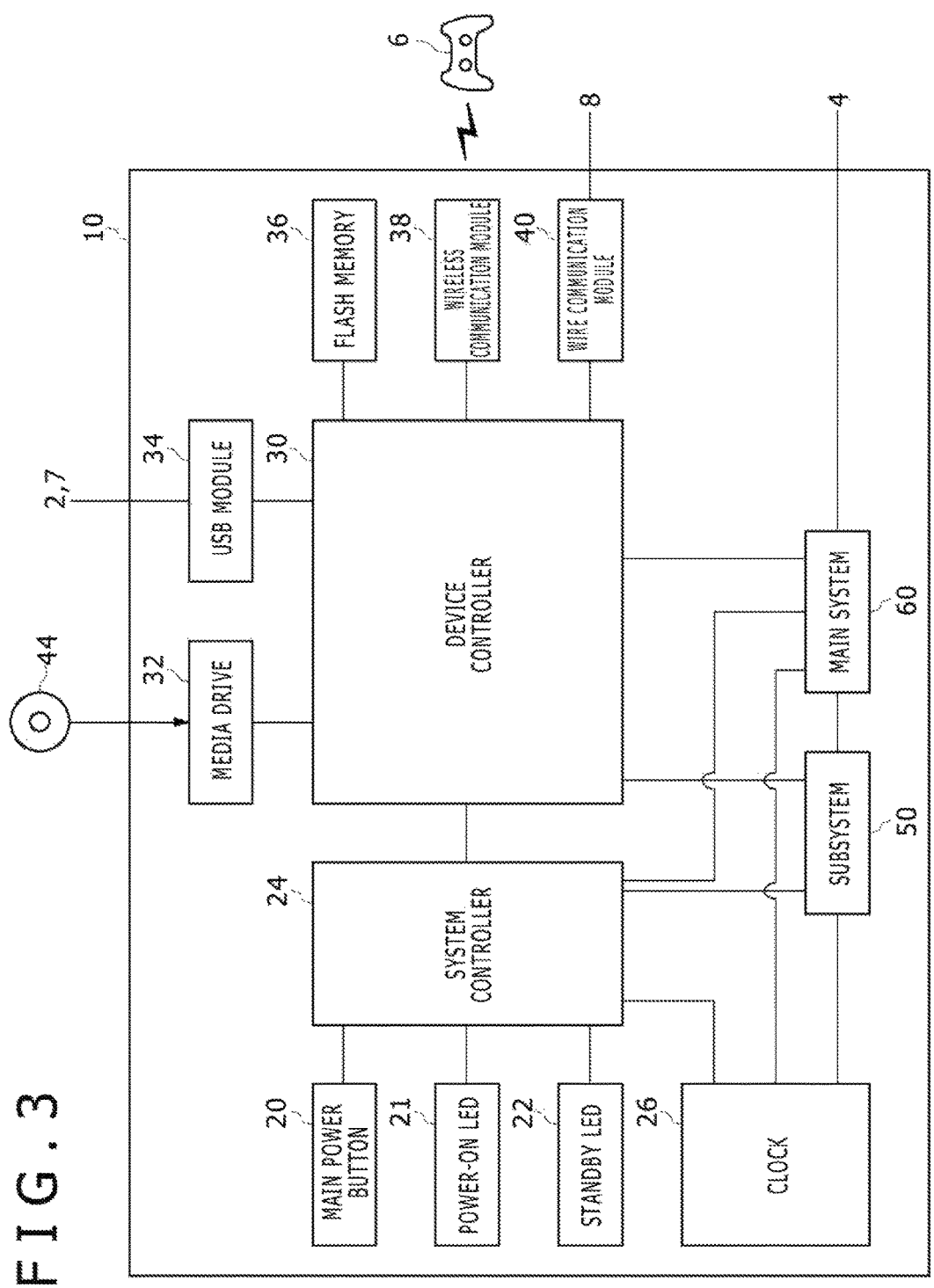
FIG. 3 is a diagram showing a functional block diagram of a game device.

FIG. 3 is a functional block diagram of the game device 10. The game device 10 includes a main power button 20, a power-on LED 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main CPU (Central Processing Unit), a memory as a main storage device and a memory controller, a GPU (Graphics Processing Unit), and the like. The GPU is used mainly for arithmetic processing of a game program. These functions may be configured as a system on chip, and formed on one chip. The main CPU has a function of executing a game program recorded in the auxiliary storage device 2.

The subsystem 50 includes a sub-CPU, a memory as a main storage device and a memory controller, and the like. The subsystem 50 does not include a GPU, and does not have a function of executing a game program. The number of circuit gates of the sub-CPU is smaller than the number of circuit gates of the main CPU. The power consumption in operation of the sub-CPU is lower than the power consumption in operation of the main CPU. The sub-CPU operates while the main CPU is in a standby state. The processing functions of the sub-CPU are limited to reduce the power consumption of the sub-CPU.

The main power button 20 is an input section to which an operating input from the user is performed. The main power button 20 is provided to a front surface of the casing of the game device 10. The main power button 20 is operated to turn on or off the supply of power to the main system 60 of the game device 10. The power-on LED 21 is lit when the main power button 20 is turned on. The standby LED 22 is lit when the main power button 20 is turned off.

The system controller 24 detects the depression of the main power button 20 by the user. When the main power button 20 is depressed while the main power supply is in an off state, the system controller 24 obtains the depressing operation as a "turn-on instruction." When the main power button 20 is depressed while the main power supply is in an on state, on the other hand, the system controller 24 obtains the depressing operation as a "turn-off instruction."

The clock 26 is a real-time clock. The clock 26 generates present date and time information, and supplies the present date and time information to the system controller 24, the subsystem 50, and the main system 60.

The device controller 30 is configured as an LSI (Large-Scale Integrated Circuit) that transfers information between devices like a Southbridge. As shown in the figure, the device controller 30 is connected with devices such as the system controller 24, the media drive 32, the USB module 34, the flash memory 36, the wireless communication module 38, the wire communication module 40, the subsystem 50, and the main system 60. The device controller 30 accommodates differences between electrical characteristics of the respective devices and differences between data transfer rates, and controls data transfer timing.

The media drive 32 is a drive device that is loaded with a ROM (Read Only Memory) medium 44 on which application software such as a game and license information are recorded, drives the ROM medium 44, and reads a program, data, and the like from the ROM medium 44. The ROM medium 44 is a read-only recording medium such as an optical disk, a magneto-optical disk, or a Blu-ray disk.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, under a communication protocol such as a Bluetooth (registered trademark) protocol or an IEEE (Institute of Electrical and Electronic Engineers) 802.11 protocol. Incidentally, the wireless communication module 38 may support a third-generation (3rd Generation) digital mobile telephone system compliant with the IMT-2000 (International Mobile Telecommunication 2000) standard defined by the ITU (International Telecommunication Union), or may further support a digital mobile telephone system of another generation. The wire communication module 40 performs wire communication with an external device. For example, the wire communication module 40 is connected to the network 3 via the AP 8.

Figure 4:
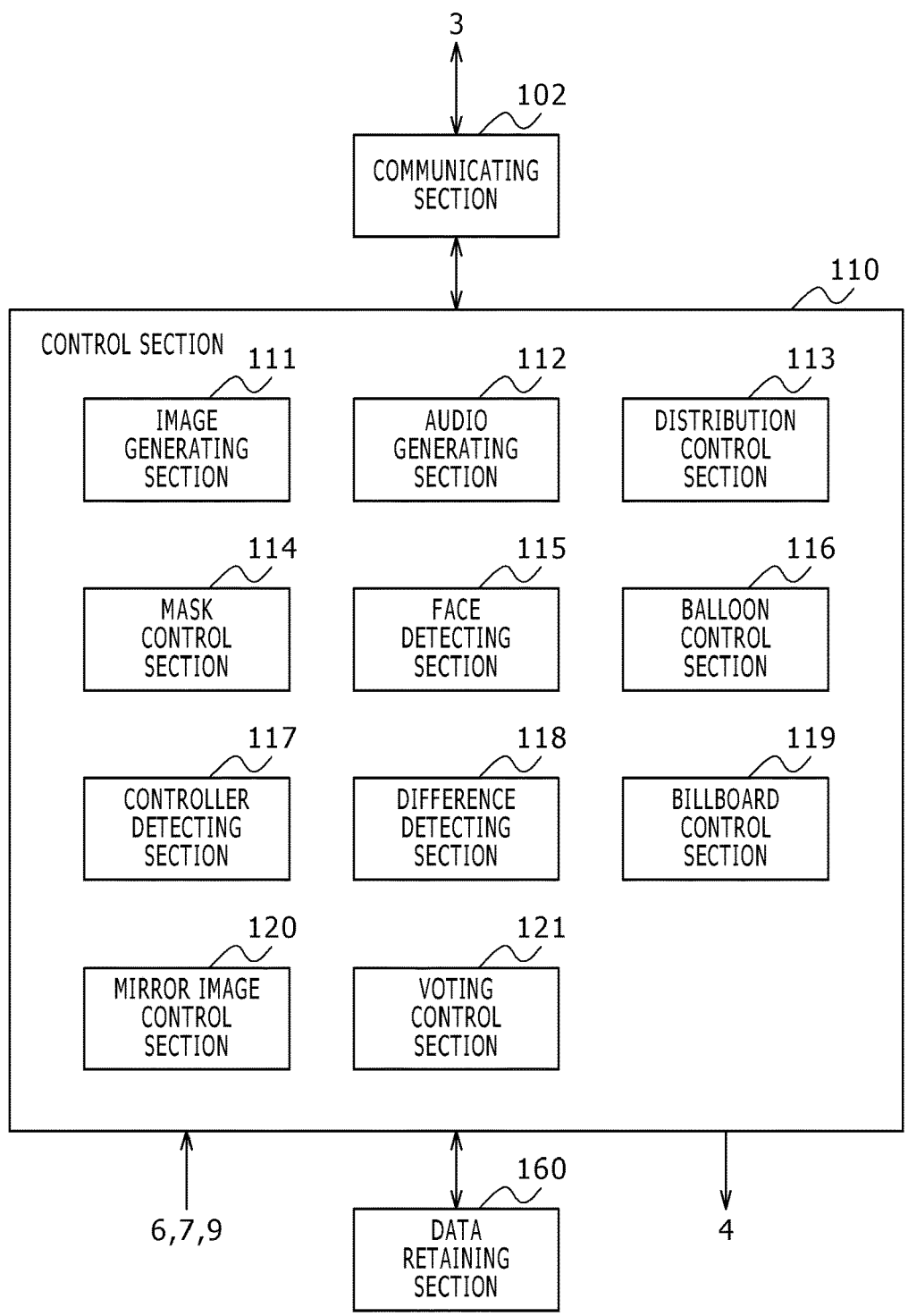
FIG. 4 is a diagram showing a configuration of the game device.

FIG. 4 shows a configuration of the game device 10. The game device 10 includes a communicating section 102, a control section 110, and a data retaining section 160. The elements described as functional blocks performing various processing in FIG. 4 can be configured by a circuit block, a memory, or another LSI in terms of hardware, and are implemented by a program loaded in a memory or the like in terms of software. Hence, it is to be understood by those skilled in the art that these functional blocks can be implemented in various forms by only hardware, only software, or combinations of hardware and software, and are not limited to any one of the forms.

The communicating section 102 has the functions of the wireless communication module 38 and the wire communication module 40 shown in FIG. 3, and controls communication via the network 3. The data retaining section 160 is provided in the auxiliary storage device 2. The data retaining section 160 stores data used by the game program and the like. The control section 110 includes an image generating section 111, an audio generating section 112, a distribution control section 113, a mask control section 114, a face detecting section 115, a balloon control section 116, a controller detecting section 117, a difference detecting section 118, a billboard control section 119, a mirror image control section 120, and a voting control section 121.

The image generating section 111 generates an image of the game controlled by the other configurations of the control section 110. The audio generating section 112 generates sound of the game controlled by the other configurations of the control section 110. The image generating section 111 and the audio generating section 112 output data of the generated image and the generated sound to the output device 4. When the distribution control section 113 receives, from the user, an instruction to distribute the data of the image and sound of the game which image and sound are generated by the image generating section 111 and the audio generating section 112 to other users, the distribution control section 113 uploads the data of the image generated by the image generating section 111 and the data of the sound generated by the audio generating section 112 to the distributing server 5 via the communicating section 102. Details of the other configurations of the control section 110 will be described later.

Figure 5:
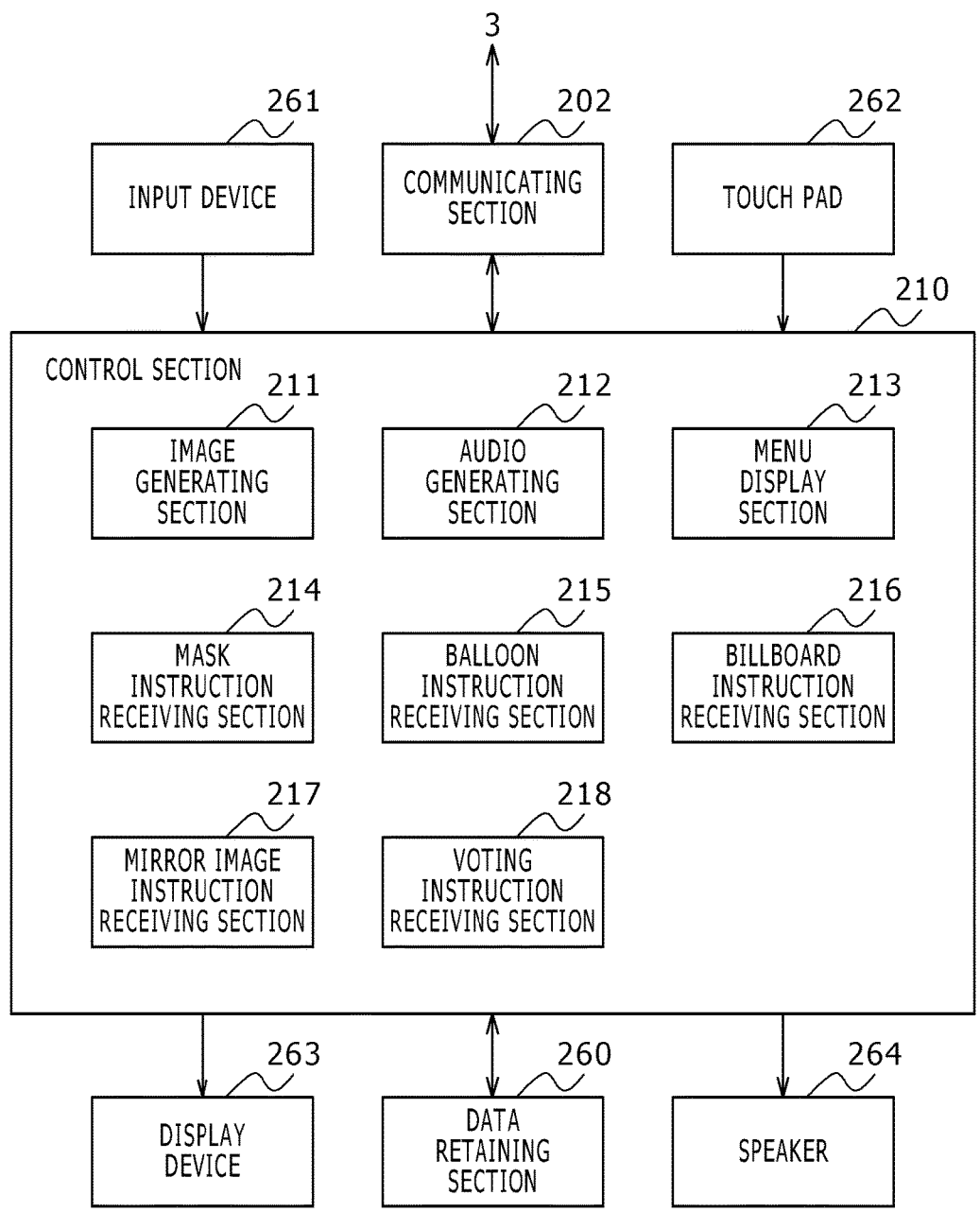
FIG. 5 is a diagram showing a configuration of a portable information terminal.

FIG. 5 shows a configuration of the portable information terminal. The portable terminal device 9 includes a communicating section 202, a control section 210, a data retaining section 260, an input device 261, a touch pad 262, a display device 263, and a speaker 264. These functional blocks can also be implemented in various forms by only hardware, only software, or combinations of hardware and software.

The communicating section 202 controls communication via the network 3. The data retaining section 260 is provided in a storage device. The data retaining section 260 stores for example data used by an application executed in the control section 210 of the portable terminal device 9 to control the game program executed in the game device 10. The display device 263 displays an image generated by the control section 210. The speaker 264 outputs sound generated by the control section 210. The input device 261 inputs an instruction from the user to the control section 210. The touch pad 262 is juxtaposed to the display device 263. The touch pad 262 inputs an instruction from the user to the control section 210.

The control section 210 includes an image generating section 211, an audio generating section 212, a menu display section 213, a mask instruction receiving section 214, a balloon instruction receiving section 215, a billboard instruction receiving section 216, a mirror image instruction receiving section 217, and a voting instruction receiving section 218. The image generating section 211 generates an image of the game controlled by the other configurations of the control section 210, and outputs the image of the game to the display device 263. The audio generating section 212 generates sound of the game controlled by the other configurations of the control section 210, and outputs the sound of the game to the speaker 264. Details of the other configurations of the control section 210 will be described later.

(Mask Display)

The game device 10 according to the embodiment tracks the position of the face of the user, and displays an image of a mask in a state of being superimposed on the face of the user. The game device 10 thereby provides a function of generating video such that the user wears the mask.

When the mask instruction receiving section 214 of the portable terminal device 9 receives an instruction to display a mask from the user via a menu screen displayed by the menu display section 213, the mask instruction receiving section 214 transmits the instruction to the game device 10. When the mask control section 114 of the game device 10 receives the instruction to display a mask from the portable terminal device 9, the mask control section 114 makes the face detecting section 115 detect the faces of humans included in an image imaged by the camera 7.

The face detecting section 115 detects the faces of the humans included in the image imaged by the camera 7. The face detecting section 115 obtains data of the image imaged by the camera 7 in predetermined timing, and detects the faces of the humans using an arbitrary known face recognition technology. While the mask is displayed, the face detecting section 115 may perform face recognition for all of frames imaged by the camera 7, or may perform face recognition at intervals of a predetermined number of frames. The faces of the humans being imaged can be tracked when the face detecting section 115 successively detects the faces included in the image imaged by the camera 7 at predetermined time intervals.

The mask control section 114 transmits, to the portable terminal device 9, data of images of the faces detected by the face detecting section 115 in order to receive an instruction to select the face of a user on which face to display the mask. The mask instruction receiving section 214 displays a list of the images of the faces which images are received from the game device 10 on the display device 263, and receives an instruction to select a face on which to display the mask from the user. When the mask instruction receiving section 214 receives the selecting instruction from the user via the input device 261 or the touch pad 262, the mask instruction receiving section 214 transmits the received selecting instruction to the game device 10.

The mask instruction receiving section 214 further receives an instruction to select a kind of an image to be displayed as the mask from the user. The image to be displayed as the mask may be selected from among pieces of two-dimensional image data or three-dimensional shape data stored in the data retaining section 260 of the portable terminal device 9 or the data retaining section 160 of the game device 10, or may be an image drawn by the user. In the latter case, the mask instruction receiving section 214 displays a drawing screen on the display device 263, and receives a drawn image from the user. When the mask instruction receiving section 214 receives an instruction to select the image, the mask instruction receiving section 214 transmits the received selecting instruction to the game device 10. At this time, in a case where the image drawn by the user or an image whose data is not stored in the data retaining section 160 of the game device 10 is selected, the data of the image is also transmitted to the game device 10.

The mask control section 114 displays the image of the mask of the kind designated by the user via the portable terminal device 9 in a state of being superimposed at the position of the face of the designated human among the faces of the humans detected by the face detecting section 115. The mask control section 114 enlarges or reduces the image of the mask to be displayed according to the size of the face detected by the face detecting section 115, and displays the image at the position of the detected face.

The face detecting section 115 detects the orientation of the face by detecting the shape of a contour of the face, the positions of eyes, a nose, and a mouth, and the like. The mask control section 114 displays the image of the mask in a state of being rotated according to the orientation of the face which orientation is detected by the face detecting section 115. In a case where the image displayed as the mask is an image generated by rendering three-dimensional shape data, the mask control section 114 renders the three-dimensional shape data by rotating the three-dimensional shape data according to the detected orientation of the face. At this time, the direction of a straight line connecting the position of the face to the position of the camera 7 may be set as a reference direction, and an angle obtained by increasing an angle of rotation of the detected face by a predetermined angle of rotation may be set as an angle of rotation of the image of the mask. That is, when the user having the mask displayed on the face of the user inclines or rotates the face, the image of the mask may be inclined or rotated by an amount larger than an actual inclination or an actual angle of rotation. It is thereby possible to emphasize the rotation of the image of the mask more, and clearly show that the image of the mask is rotated according to the rotation of the face.

The larger the angle of rotation of the face from the reference direction is, the more the angle of rotation of the image of the mask may be increased from the actual angle of rotation.

In a case where the image displayed as the mask is a two-dimensional image, the mask may be rotated according to the rotation of the face when the face is rotated about the straight line connecting the position of the face to the position of the camera 7, whereas the rotation of the face about a straight line perpendicular to the straight line connecting the position of the face to the position of the camera 7 may be ignored. In another example, when the face is rotated about a vertical perpendicular to the straight line connecting the position of the face to the position of the camera 7, the image displayed as the mask may be displayed in a state of being reduced in a direction perpendicular to the straight line. In yet another example, a two-dimensional image to be displayed as the mask may be pasted as a texture to the surface of a solid body modeled on a head or a solid body such as a sphere, a cylinder, or the like, and the image displayed as the mask may be rotated by rotating the solid body according to the orientation of the face. Also in this case, the image displayed as the mask may be rotated by an angle larger than the actual angle of rotation of the face.

When the face detecting section 115 becomes unable to detect the face because the face of the human on which face the mask is displayed has gone out of the field of view of the camera 7 or the person has turned the back to the camera 7 or hidden the face, the mask control section 114 erases the mask. At this time, the mask may be erased after display of a state of a noise entering a region in which the mask has been displayed, a state of a character displayed on a screen interfering with the mask, or the like.

Figure 6:
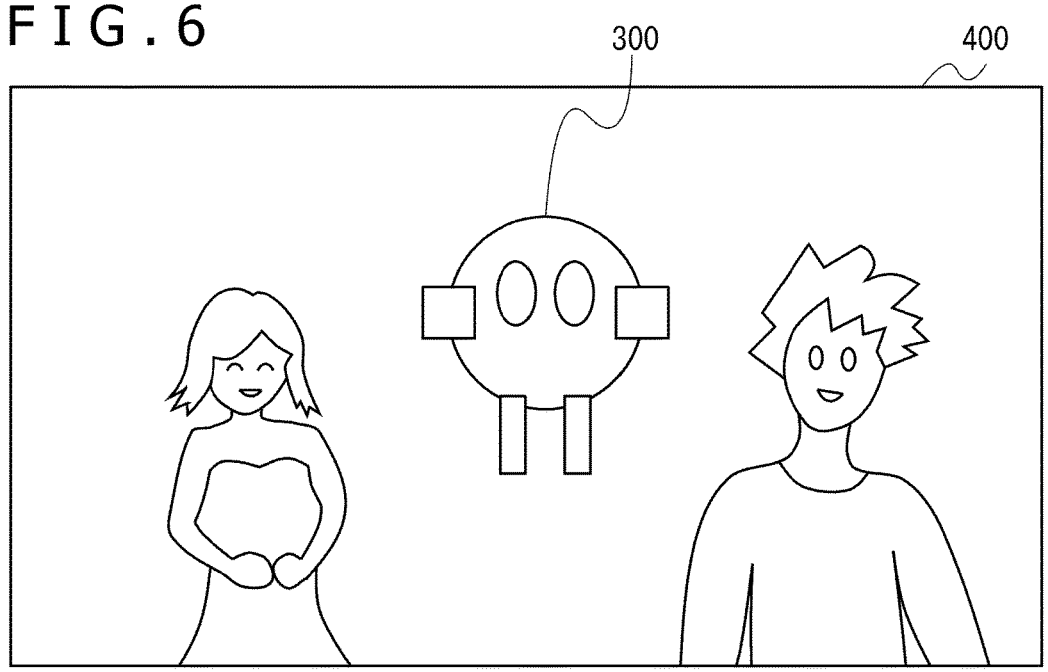
FIG. 6 is a diagram showing an example of a screen displayed on a display of an output device.

FIG. 6 shows an example of a screen 400 displayed on the display of the output device 4. The display of the output device 4 displays an image imaged by the camera 7, and displays a character 300 in a state of being superimposed on the imaged image.

Figure 7:
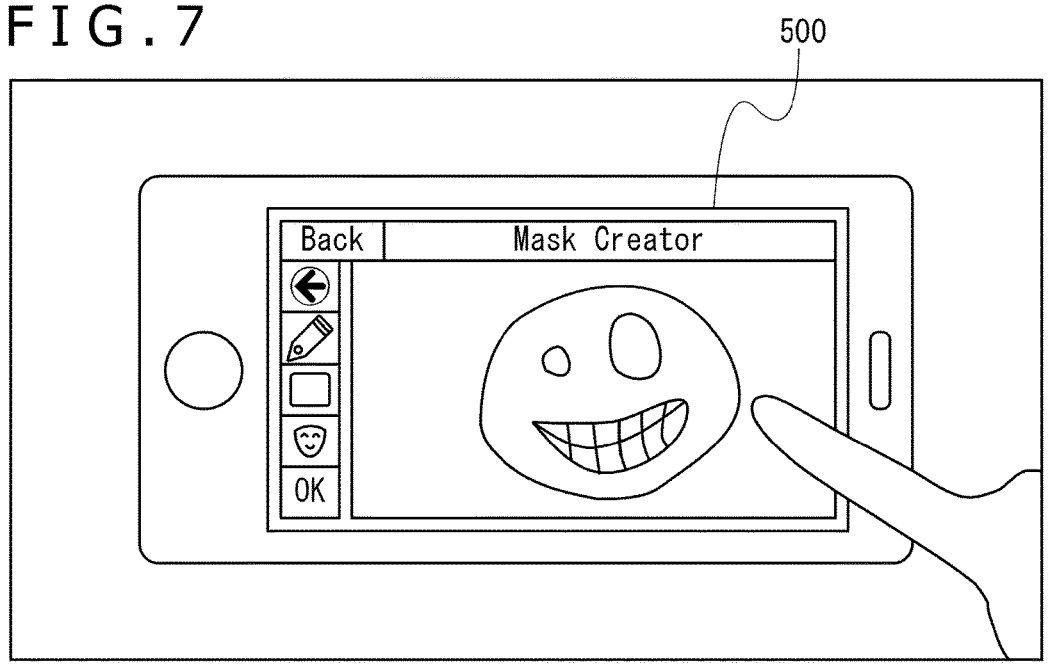
FIG. 7 is a diagram showing an example of a screen displayed on a display device of the portable terminal device.

FIG. 7 shows an example of a screen displayed on the display device 263 of the portable terminal device 9. The mask instruction receiving section 214 of the portable terminal device 9 displays a drawing screen 500 for the user to draw a mask on the display device 263. The user can draw an image to be displayed as a mask on the drawing screen 500. This drawing screen 500 is displayed on only the display device 263 of the portable terminal device 9, and is not displayed on a screen distributed from the distribution control section 113.

Figure 8:
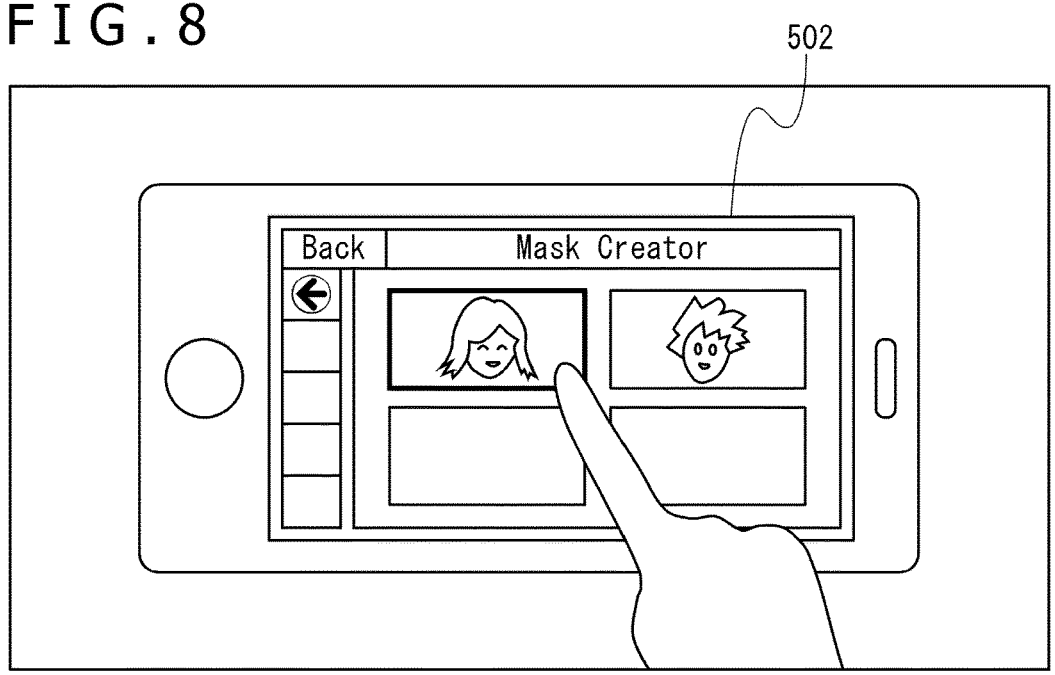
FIG. 8 is a diagram showing an example of the screen displayed on the display device of the portable terminal device.

FIG. 8 shows an example of the screen displayed on the display device 263 of the portable terminal device 9. In order to receive, from the user, an instruction to select a user having a face on which to display the mask, the mask instruction receiving section 214 of the portable terminal device 9 obtains image data of all of faces in the imaged image which faces are detected by the face detecting section 115 of the game device 10 from the game device 10, and displays a list 502 of the obtained faces of users on the display device 263. The user can select the face of a person to whom to attach the mask from among all of the faces of the persons whose faces are imaged by the camera 7 and detected by the face detecting section 115 on the screen displaying the list 502 of the faces. The screen of the list 502 of the faces is also displayed on only the display device 263 of the portable terminal device 9, and is not displayed on the screen distributed from the distribution control section 113. When the mask instruction receiving section 214 receives a selecting instruction by the user from the displayed list 502 of the faces, the mask instruction receiving section 214 transmits the received selecting instruction to the game device 10.

Figure 9:
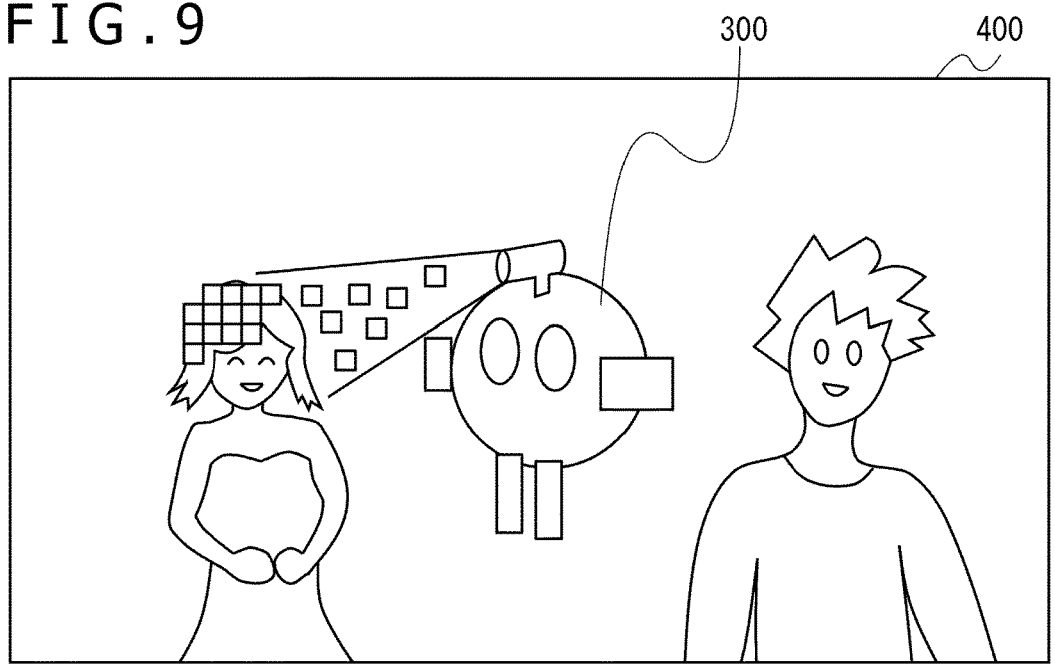
FIG. 9 is a diagram showing an example of the screen displayed on the display of the output device.

FIG. 9 shows an example of the screen 400 displayed on the display of the output device 4. When the mask control section 114 of the game device 10 obtains the instruction to select the face on which to display the mask from the portable terminal device 9, the mask control section 114 displays a state in which the character 300 blows the material of the mask onto the face.

Figure 10:
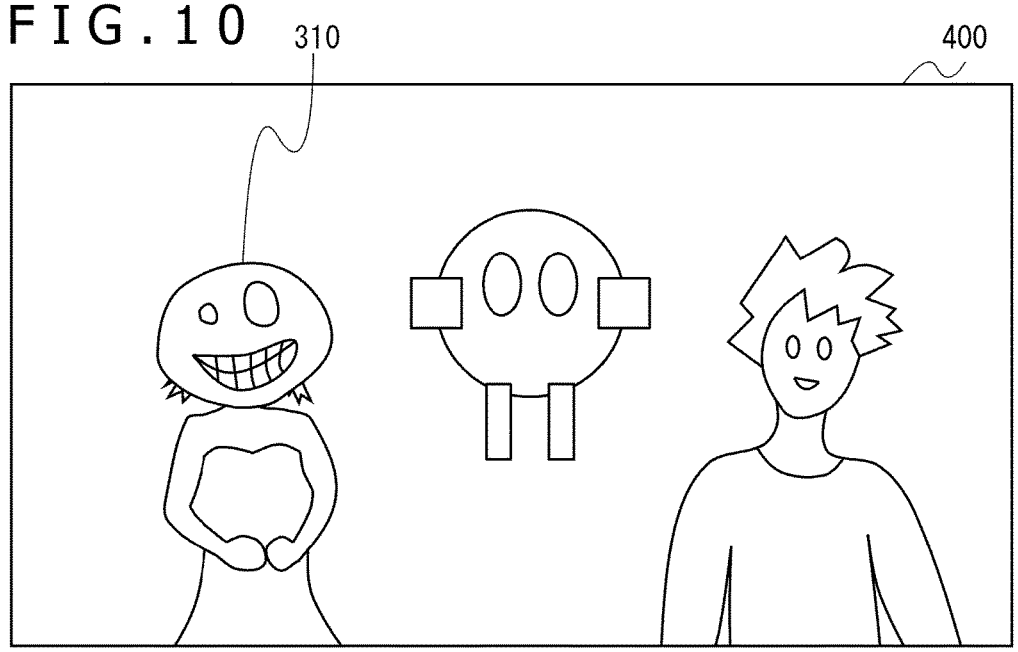
FIG. 10 is a diagram showing an example of the screen displayed on the display of the output device.

FIG. 10 shows an example of the screen 400 displayed on the display of the output device 4. After an end of the display of the animation in which the character 300 blows the material of the mask onto the face, the mask control section 114 displays a mask 310 at the position of the face detected by the face detecting section 115.

Figure 11:
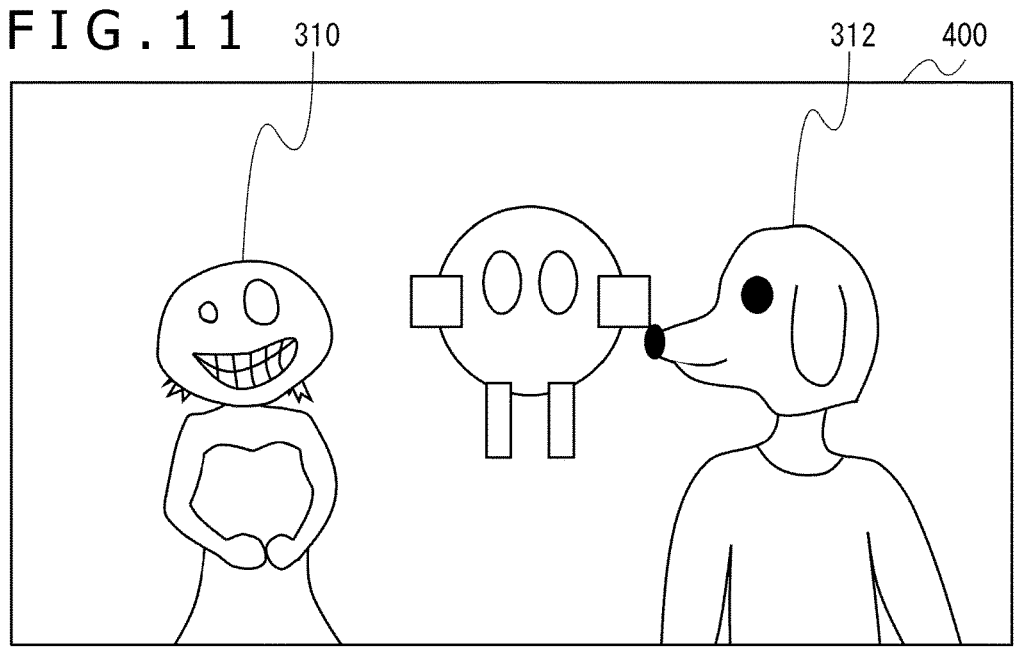
FIG. 11 is a diagram showing an example of the screen displayed on the display of the output device.

FIG. 11 shows an example of the screen 400 displayed on the display of the output device 4. When the user having a mask 312 displayed on the face of the user inclines the face, the mask control section 114 displays the mask 312 in a state of being inclined by an amount larger than the inclination of the face detected by the face detecting section 115.

Figure 12:
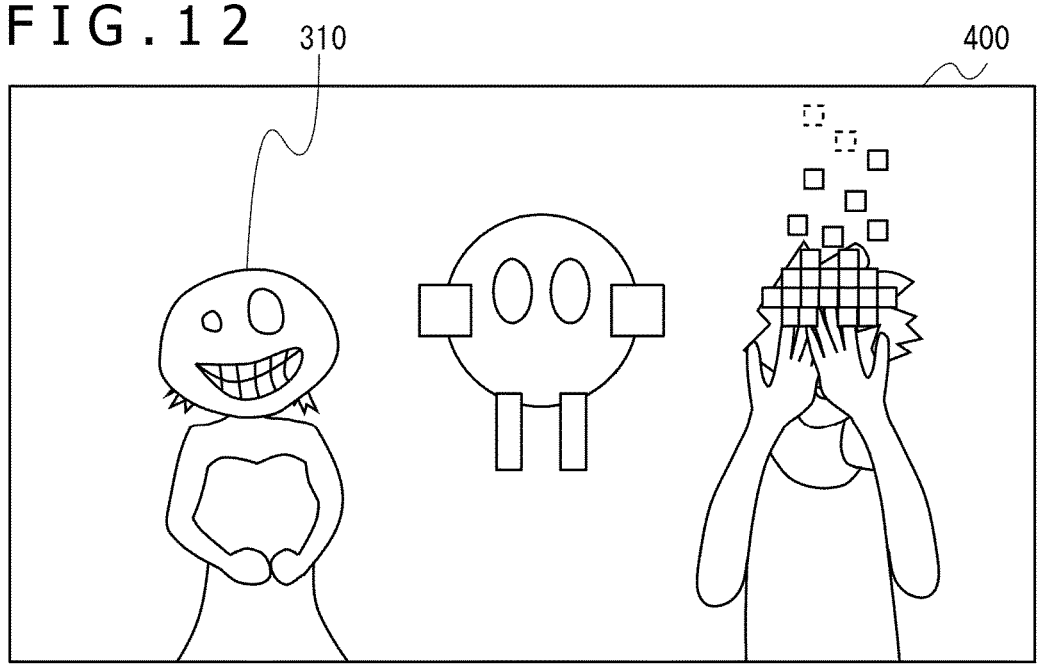
FIG. 12 is a diagram showing an example of the screen displayed on the display of the output device.

FIG. 12 shows an example of the screen 400 displayed on the display of the output device 4. When the user whose face has the mask 312 displayed thereon covers and hides the face by hand, the face detecting section 115 becomes unable to detect the face of the user. At this time, the mask control section 114 makes an animation display of a process in which the displayed mask 312 disappears. After the animation display is ended, the mask control section 114 erases the mask 312.

(Balloon Display)

The game device 10 according to the embodiment tracks the position of the input device 6, and displays a string extending from the position of the input device 6 and an object connected to the string. The game device 10 thereby provides a function of generating video such that a balloon is connected to the input device 6.

When the balloon instruction receiving section 215 of the portable terminal device 9 receives an instruction to display a balloon from the user via the menu screen displayed by the menu display section 213, the balloon instruction receiving section 215 transmits the instruction to the game device 10. When the balloon control section 116 of the game device 10 receives the instruction to display a balloon from the portable terminal device 9, the balloon control section 116 transmits identifying information of currently active input devices 6 recognized by the game device 10 to the portable terminal device 9.

The balloon instruction receiving section 215 receives, from the user, an instruction to select an input device 6 to which to connect the balloon from among the currently active input devices 6. The balloon instruction receiving section 215 further receives an instruction to select a kind of image to be displayed as the balloon from the user. The image to be displayed as the balloon may be selected from among pieces of two-dimensional image data or three-dimensional shape data stored in the data retaining section 260 of the portable terminal device 9 or the data retaining section 160 of the game device 10, or may be an image drawn by the user. In the latter case, the balloon instruction receiving section 215 displays a drawing screen on the display device 263, and receives a drawn image from the user. When the balloon instruction receiving section 215 receives the instruction to select the input device 6 and the instruction to select the image, the balloon instruction receiving section 215 transmits the received selecting instructions to the game device 10. At this time, when the image drawn by the user or an image whose data is not stored in the data retaining section 160 of the game device 10 is selected, the data of the image is also transmitted to the game device 10. The balloon control section 116 retains a correspondence relation between the kind of the image of the balloon and the input device 6 to which the balloon is connected.

When the touch pad 79 of the input device 6 is pressed, and the balloon is associated with the input device 6, the balloon control section 116 displays the image associated with the input device 6 at the position of the input device 6, and enlarges the image while the touch pad 79 is pressed. When the finger is removed from the touch pad 79, the balloon control section 116 displays the image enlarged according to a time of input to the touch pad 79 at an end of the string connected to the input device 6. The balloon control section 116 may display the image in an original size, may display the image after resizing the image to a predetermined size, or may receive an instruction to enlarge or reduce the image from the user and display the image in an enlarged or reduced state. The balloon control section 116 may make the display by pasting, as a texture, a two-dimensional image to be displayed as the balloon to the surface of a solid body modeled on a balloon or a solid body such as a sphere, a spheroid, or the like. The same image may be pasted to a plurality of surfaces of the solid body. The balloon control section 116 may determine the length of the string according to the time of input to the touch pad 79, or may set the length of the string to a predetermined length.

The controller detecting section 117 detects the input device 6 included in the image imaged by the camera 7. The controller detecting section 117 obtains the data of the image imaged by the camera 7 in predetermined timing, and detects light emitted by the light emitting portion 85 using a known image analysis technology. The controller detecting section 117 may detect the position of the input device 6 in all of frames imaged by the camera 7, or may detect the position of the input device 6 at intervals of a predetermined number of frames. The position of the input device 6 being imaged can be tracked when the controller detecting section 117 successively detects the position of the input device 6 included in the image imaged by the camera 7 at predetermined time intervals.

The balloon control section 116 may set a predetermined buoyancy to the balloon, and simulate, by physical calculation, and display a state in which the balloon moves according to the movement of the input device 6. A control point may be provided at a predetermined position of the string that connects the balloon and the input device 6 to each other, and the movement of the string as a whole may be simulated by simulating the movement of the control point. The balloon control section 116 may move the balloon by a simple simulation in which a part of a physical phenomenon is simplified.

The difference detecting section 118 detects a difference between frames in a moving image. The difference detecting section 118 detects a difference between frames at least in the surroundings of the balloon while the balloon is displayed. When the difference detecting section 118 detects a predetermined amount of difference or more over a predetermined period in a region larger than a predetermined region in the vicinity of the balloon, the balloon control section 116 makes a force having a magnitude corresponding to the amount of the difference, the area of the region in which the difference occurred, or a period during which the difference occurred act on the balloon in a direction from the position of the region in which the difference occurred to the center of gravity of the balloon, and moves the balloon by physical calculation. This for example enables the user to move the balloon by making a motion of hitting the balloon by hand. It is therefore possible to provide an environment in which a highly entertaining interaction can be experienced. The balloon control section 116 may move the balloon by a simple simulation rather than physical calculation. For example, the balloon may be moved by a predetermined amount in an opposite direction from the region in which the difference occurred.

The balloon control section 116 may track the movement of the body of the user by analyzing the image imaged by the camera 7 in place of the detection of the difference between the frames in the moving image or in addition to the detection of the difference, and may make a force act on the balloon and move the balloon when determining that a part of the body of the user has hit the balloon. For example, the shape of a hand of the user may be recognized, and the balloon may be moved when the hand of the user has hit the balloon.

When the controller detecting section 117 becomes unable to detect the input device 6 because the input device 6 has gone out of the field of view of the camera 7, or the user has directed the input device 6 in an opposite direction from the camera 7 or covered the light emitting portion 85 by hand, the balloon control section 116 erases the balloon. At this time, the balloon may be erased after display of for example a process in which the string connecting the balloon to the input device 6 is broken and the balloon flies upward.

Figure 13:
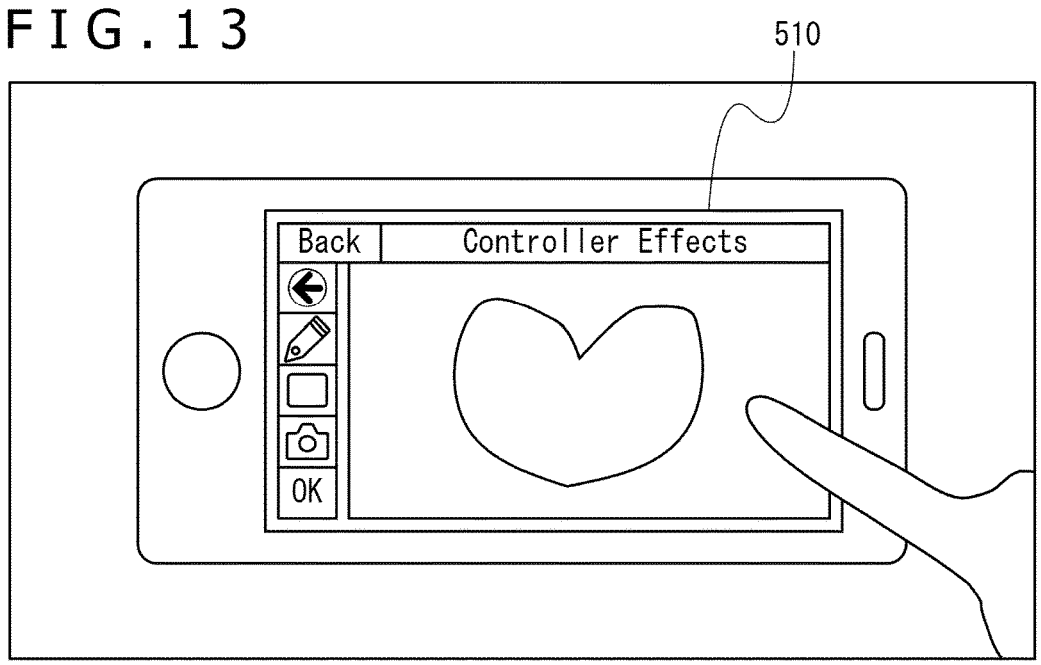
FIG. 13 is a diagram showing an example of the screen displayed on the display device of the portable terminal device.

FIG. 13 shows an example of the screen displayed on the display device 263 of the portable terminal device 9. The balloon instruction receiving section 215 of the portable terminal device 9 displays a drawing screen 510 for the user to draw a balloon on the display device 263. The user can draw an image to be displayed as the balloon on the drawing screen 510. This drawing screen 510 is displayed on only the display device 263 of the portable terminal device 9, and is not displayed on the screen distributed from the distribution control section 113.

Figure 14:
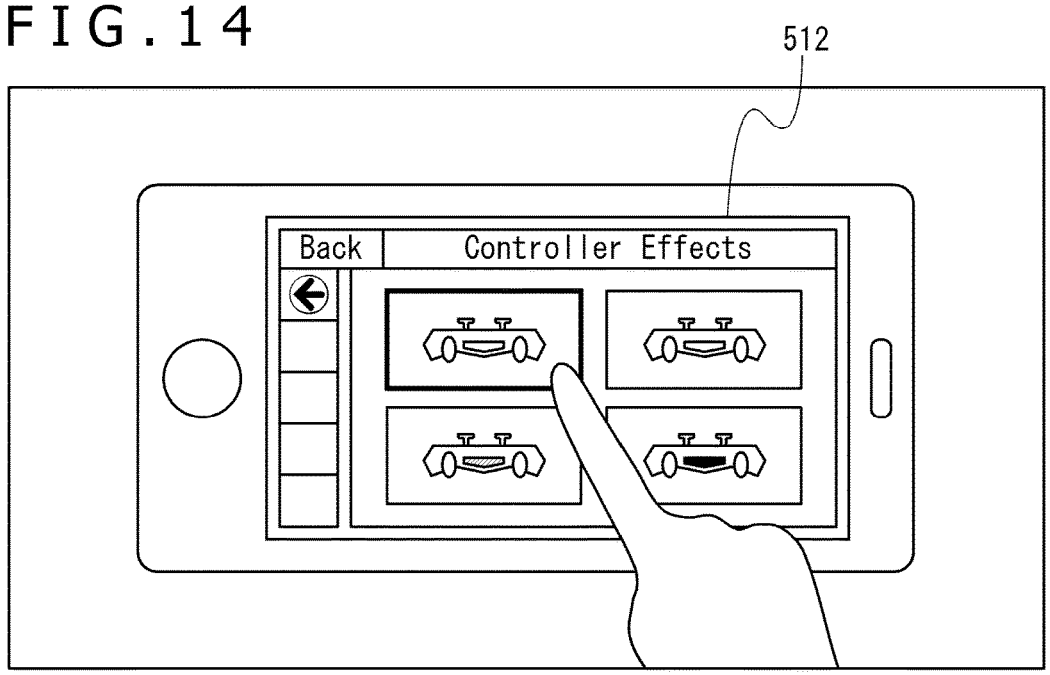
FIG. 14 is a diagram showing an example of the screen displayed on the display device of the portable terminal device.

FIG. 14 shows an example of the screen displayed on the display device 263 of the portable terminal device 9. In order to receive, from the user, an instruction to select the input device 6 for which to display the balloon, the balloon instruction receiving section 215 obtains identifying information of currently active input devices 6 from the game device 10, and displays a list 512 of the obtained active input devices 6 on the display device 263. When the balloon instruction receiving section 215 receives a selecting instruction by the user from the displayed list 512 of the input devices 6, the balloon instruction receiving section 215 transmits the received selecting instruction to the game device 10. The screen of the list 512 is also displayed on only the display device 263 of the portable terminal device 9, and is not displayed on the screen distributed from the distribution control section 113.

Figure 15:
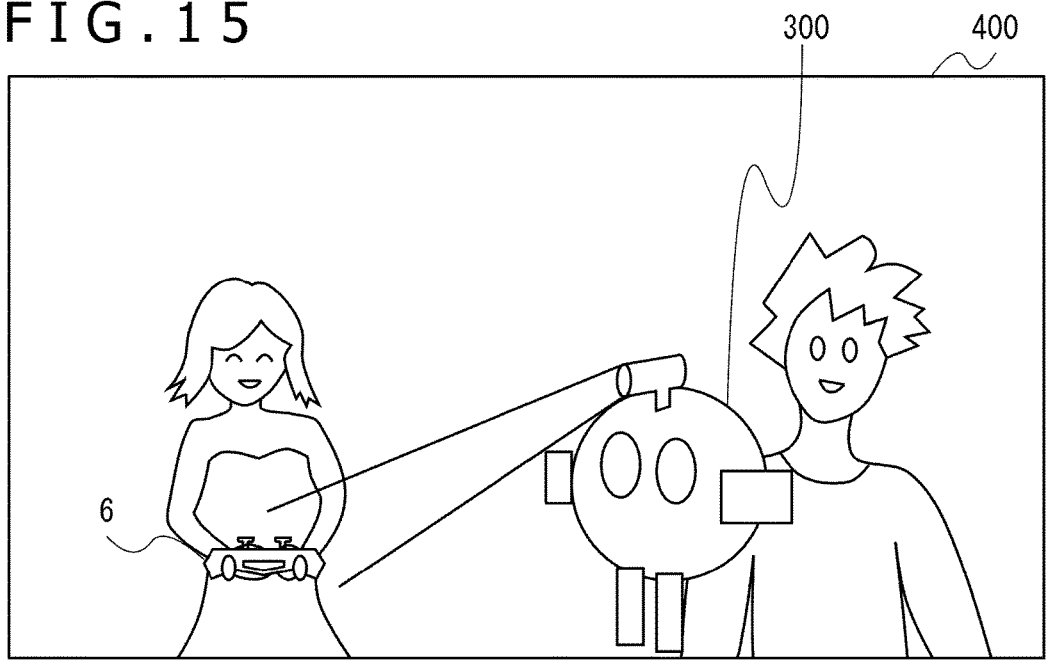
FIG. 15 is a diagram showing an example of the screen displayed on the display of the output device.

FIG. 15 shows an example of the screen 400 displayed on the display of the output device 4. When the balloon control section 116 obtains the instruction to select the input device 6 for which to display the balloon from the portable terminal device 9, the balloon control section 116 displays a state in which the character 300 irradiates the input device 6 with light, and thus displays a representation such that the character 300 imparts a function of displaying the balloon to the input device 6.

Figure 16:
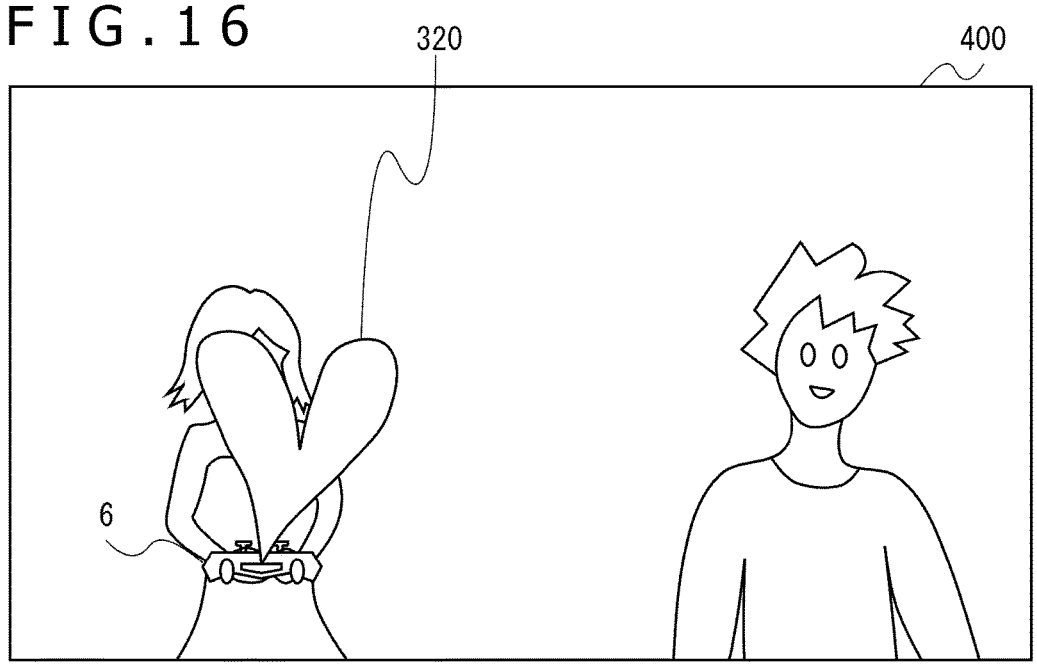
FIG. 16 is a diagram showing an example of the screen displayed on the display of the output device.

FIG. 16 shows an example of the screen 400 displayed on the display of the output device 4. When the balloon control section 116 obtains information indicating that the touch pad 79 is pressed from the input device 6, the balloon control section 116 displays a state in which an image 320 associated with the input device 6 swells from the position of the input device 6.

Figure 17:
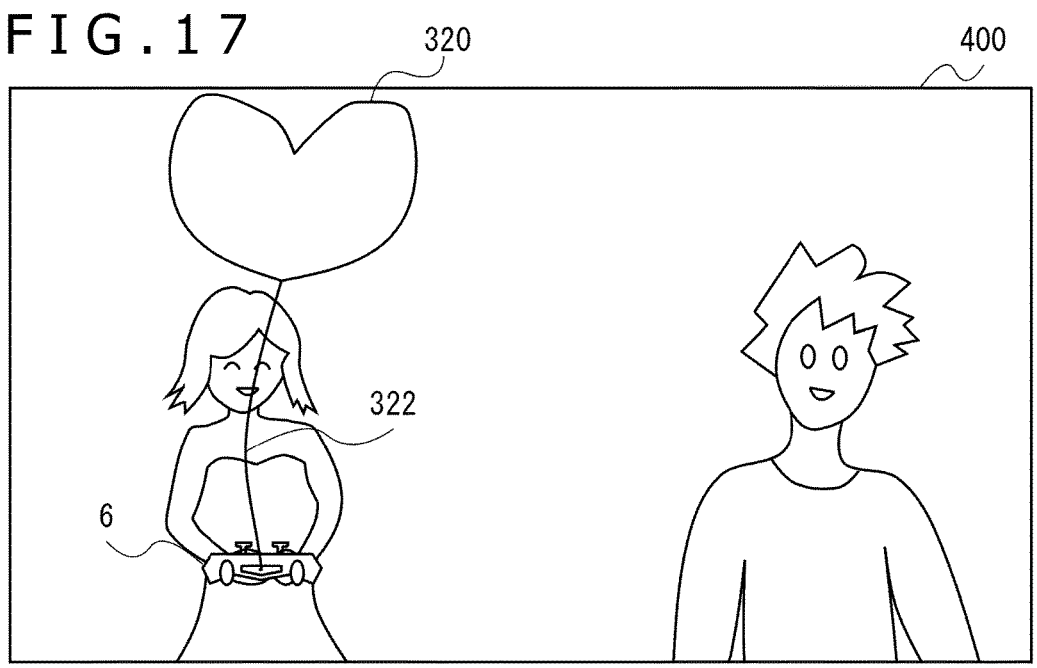
FIG. 17 is a diagram showing an example of the screen displayed on the display of the output device.

FIG. 17 shows an example of the screen 400 displayed on the display of the output device 4. When the balloon control section 116 obtains, from the input device 6, information indicating that the finger is removed from the touch pad 79, the balloon control section 116 displays a state in which the image 320 associated with the input device 6 is connected to the input device 6 by a string 322. The balloon includes: the part of a root of the string 322 as a first part displayed at a position calculated by the balloon control section 116 according to a position at which the input device 6 is detected, the first part being displayed so as to follow the movement of the input device 6 as a tracking object; and the image 320 as a second part moved by the balloon control section 116 so as to be dependent on the movement of the part of the root of the string 322. The balloon control section 116 makes the part of the root of the string 322 move so as to follow the position of the input device 6 detected by the controller detecting section 117, and makes the image 320 of the balloon move so as to be pulled by the string 322. In addition, when the difference detecting section 118 detects a difference in the surroundings of the image 320 of the balloon, the image 320 of the balloon is moved according to the detected difference.

Figure 18:
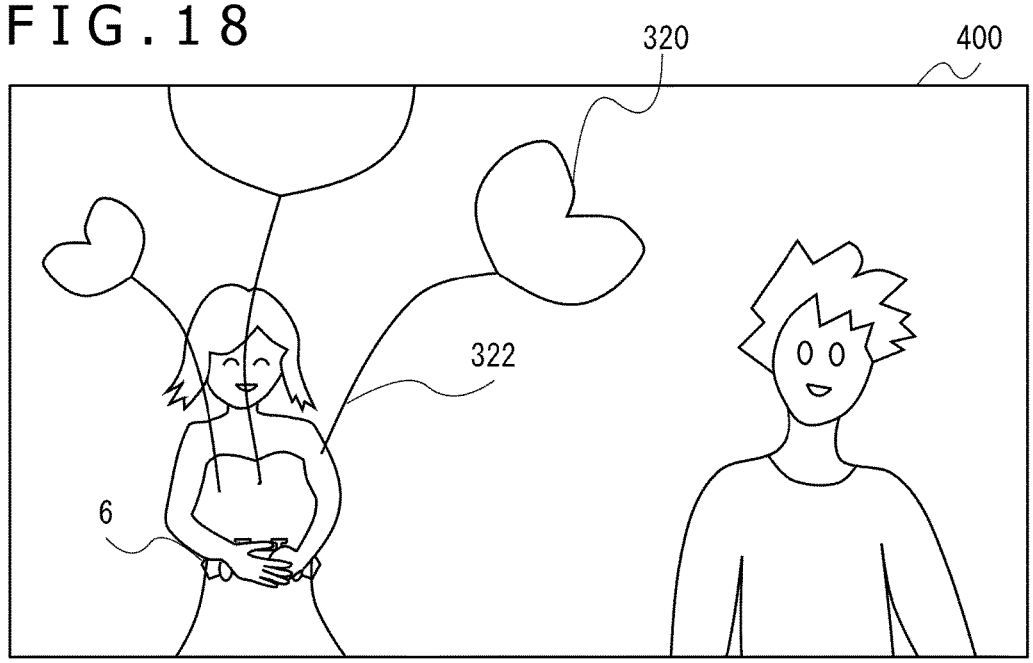
FIG. 18 is a diagram showing an example of the screen displayed on the display of the output device.

FIG. 18 shows an example of the screen 400 displayed on the display of the output device 4. When the balloon control section 116 obtains information indicating that the light emitting portion 85 of the input device 6 cannot be detected from the controller detecting section 117, the balloon control section 116 cuts the string 322 of the balloon connected to the input device 6, and separates the part of the root of the string 322 and the image 320 of the balloon from each other. The user can recognize, from the screen displayed on the output device 4, that the part of the root of the string 322 of the balloon is moved so as to follow the input device 6. The user can therefore easily understand a relation between the hiding of the light emitting portion 85 of the input device 6 as a tracking object and the part of the root of the string 322 following the light emitting portion 85 and the detaching from the input device 6 of the image 320 of the balloon moved so as to be dependent on the string 322. The balloon control section 116 may make the balloon detached from the string 322 move upward or float buoyantly in the air according to the buoyancy of the balloon.

(Billboard Display)

The game device 10 according to the embodiment provides a function of displaying, on the screen, a billboard displaying characters, an image, or the like drawn by the user.

When the billboard instruction receiving section 216 of the portable terminal device 9 receives an instruction to display a billboard from the user via the menu screen displayed by the menu display section 213, the billboard instruction receiving section 216 displays an image drawing screen on the display device 263, and receives a drawn image to be displayed as a billboard. When the user completes drawing the image, the billboard instruction receiving section 216 transmits an instruction to display the billboard to the game device 10. At this time, the data of the image drawn by the user is also transmitted to the game device 10. In addition, a designation of a position on the screen at which position to display the billboard is received from the user, and the received display position is transmitted to the game device 10.

The billboard control section 119 of the game device 10 displays the image obtained from the portable terminal device 9 as the billboard at the designated position on the game screen. When the screen showing the user playing is distributed, the billboard displayed on the screen is also displayed on the distributed screen. The user can therefore post a message for viewers or the like on the billboard. For example, the contents of the game being distributed, a comment related to the game, the theme of the moving image being distributed, an announcement to viewers, and the like can be posted on the billboard.

As in the above-described example of the balloon, when the difference detecting section 118 detects a difference between frames in the vicinity of the displayed billboard, the billboard control section 119 affects the displayed billboard according to the detected difference. For example, when the difference detecting section 118 detects a predetermined amount of difference or more over a predetermined period in a region larger than a predetermined region in the vicinity of the billboard, the billboard control section 119 makes a force having a magnitude corresponding to the amount of the difference, the area of the region in which the difference occurred, or a period during which the difference occurred act on the billboard in a direction from the position of the region in which the difference occurred to the center of gravity of the billboard, and moves the billboard by physical calculation. This for example enables the user to move the billboard by making a motion of hitting the billboard by hand. It is therefore possible to provide an environment in which a highly entertaining interaction can be experienced. The billboard control section 119 may move the billboard by a simple simulation rather than physical calculation. For example, the billboard may be moved by a predetermined amount in an opposite direction from the region in which the difference occurred. In a case where the billboard is displayed as a translucent image, the billboard control section 119 may display a state in which noise occurs in the region in which the difference occurred in the image of the billboard or noise occurs in a region displayed through the billboard in the background of the billboard.

The billboard control section 119 may track the movement of the body of the user by analyzing the image imaged by the camera 7 in place of the detection of the difference between the frames in the moving image or in addition to the detection of the difference, and may make a force act on the billboard and move the billboard when determining that a part of the body of the user has hit the billboard. For example, the shape of a hand of the user may be recognized, and the billboard may be moved when the hand of the user has hit the billboard.

Figure 19:
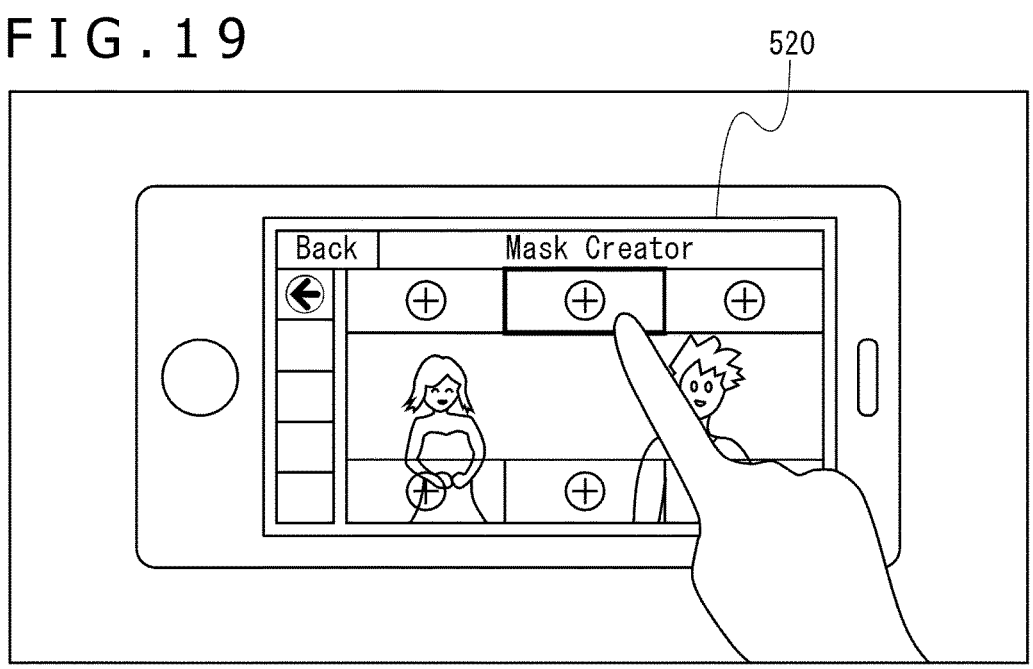
FIG. 19 is a diagram showing an example of the screen displayed on the display device of the portable terminal device.

FIG. 19 shows an example of the screen displayed on the display device 263 of the portable terminal device 9. The billboard instruction receiving section 216 of the portable terminal device 9 displays a screen 520 for the user to designate a position in which to display the billboard on the display device 263. The user designates the position in which to display the billboard on the screen 520. At this time, the billboard instruction receiving section 216 obtains the image imaged by the camera 7 or a display image generated by the image generating section 111 from the game device 10, displays the image imaged by the camera 7 or the display image generated by the image generating section 111 on the screen 520, and receives a designation of the position and size in which to display the billboard. The user can therefore adjust the position and size in which to display the billboard while checking the image displayed on the output device 4, a terminal of a viewer as a distribution destination, or the like. When another billboard is already displayed, the image set as the billboard may be displayed at the set position. This screen 520 is displayed on only the display device 263 of the portable terminal device 9, and is not displayed on the screen distributed from the distribution control section 113.

Figure 20:
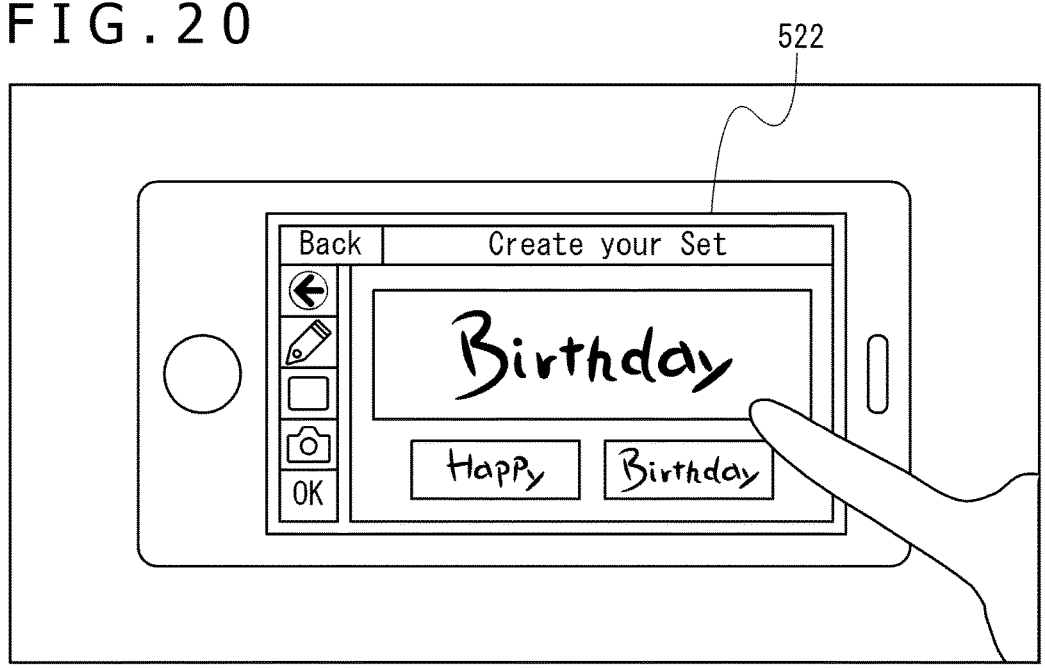
FIG. 20 is a diagram showing an example of the screen displayed on the display device of the portable terminal device.

FIG. 20 shows an example of the screen displayed on the display device 263 of the portable terminal device 9. The billboard instruction receiving section 216 displays a drawing screen 522 for the user to draw a billboard on the display device 263. The user can draw an image to be displayed as the billboard on the drawing screen 522. This drawing screen 522 is also displayed on only the display device 263 of the portable terminal device 9, and is not displayed on the screen distributed from the distribution control section 113.

Figure 21:
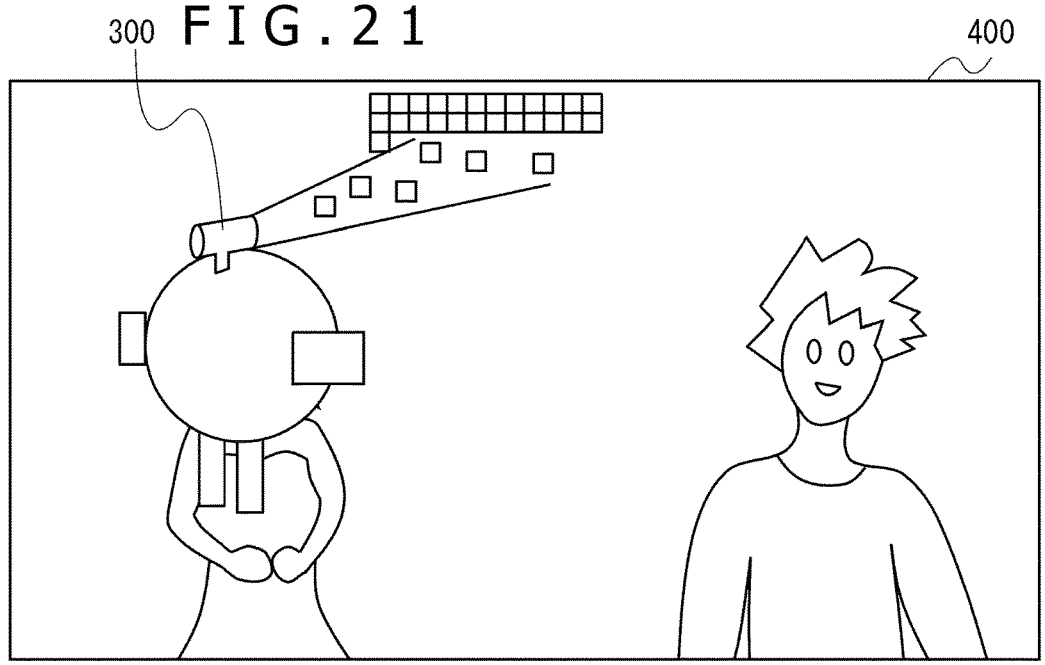
FIG. 21 is a diagram showing an example of the screen displayed on the display of the output device.

FIG. 21 shows an example of the screen 400 displayed on the display of the output device 4. When the billboard control section 119 of the game device 10 obtains the data of the image to be displayed as the billboard from the portable terminal device 9, the billboard control section 119 displays a state in which the character 300 blows the material of the billboard onto the display position of the billboard.

Figure 22:
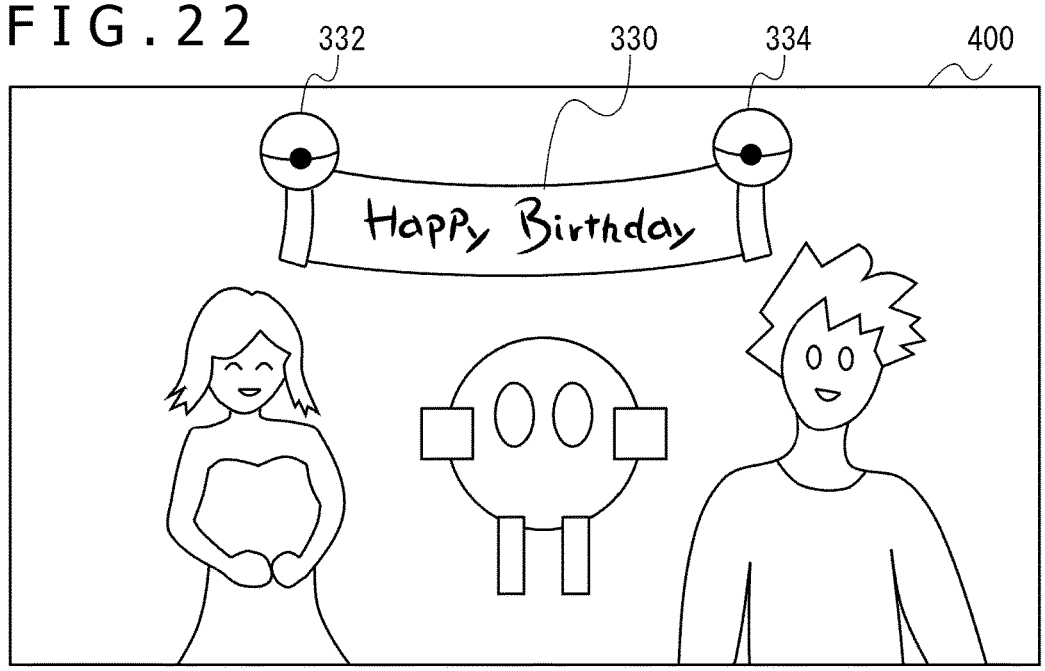
FIG. 22 is a diagram showing an example of the screen displayed on the display of the output device.

FIG. 22 shows an example of the screen 400 displayed on the display of the output device 4. After an end of the display of the animation in which the character 300 blows the material of the billboard, the billboard control section 119 displays a billboard 330 at the position designated by the user. The billboard 330 is supported at both ends by two objects 332 and 334.

Figure 23:
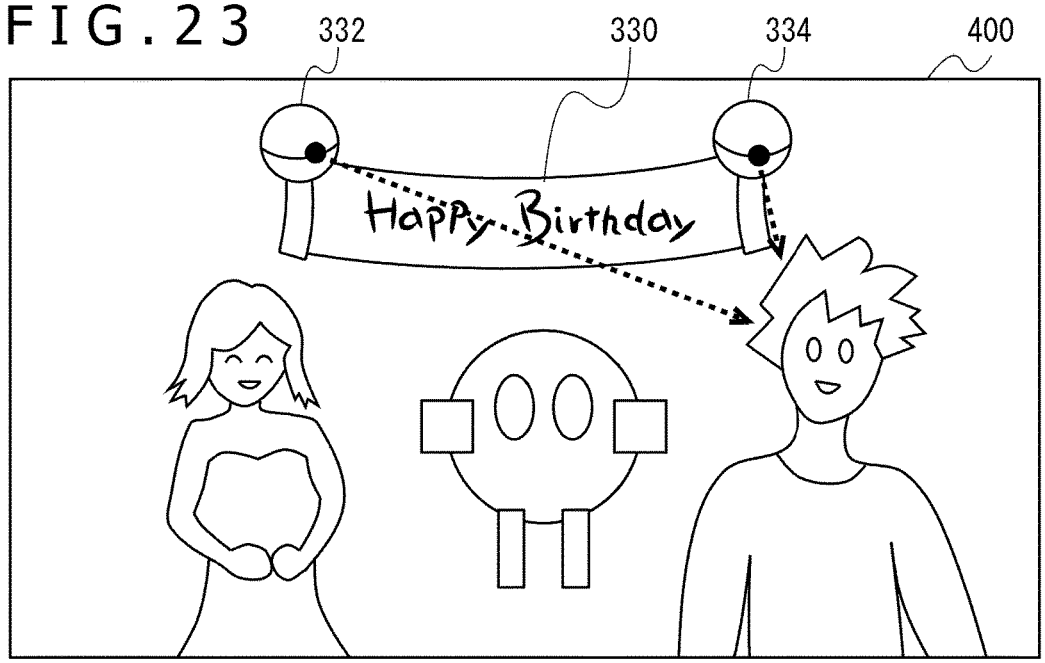
FIG. 23 is a diagram showing an example of the screen displayed on the display of the output device.

FIG. 23 shows an example of the screen 400 displayed on the display of the output device 4. The two objects 332 and 334 supporting both ends of the billboard 330 are rotated and displayed so as to be directed toward the position of the face of the user detected by the face detecting section 115.

Figure 24:
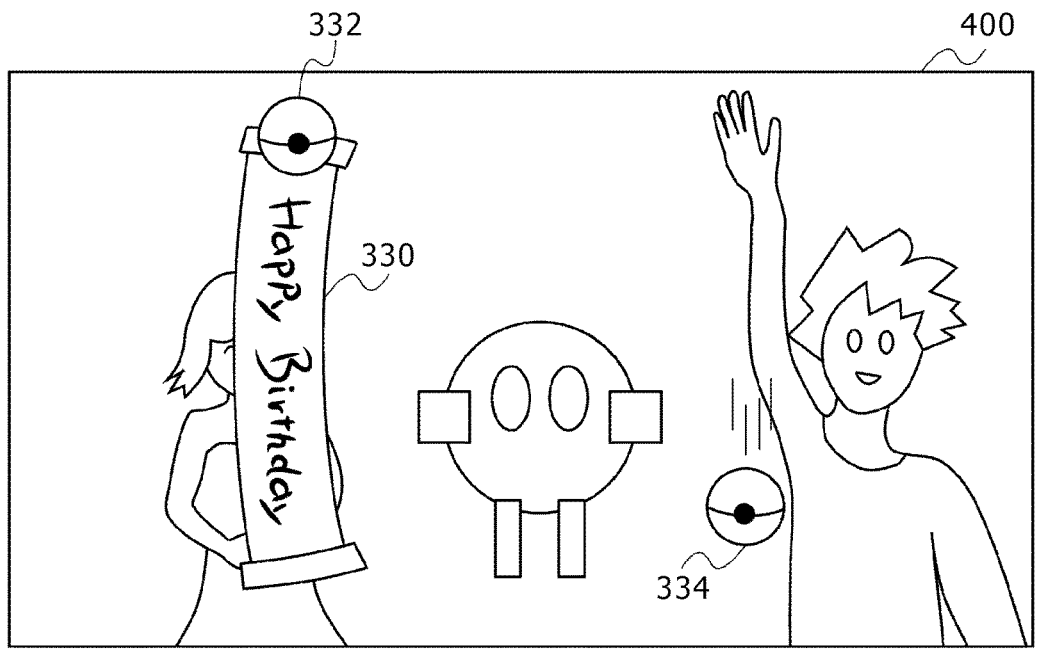
FIG. 24 is a diagram showing an example of the screen displayed on the display of the output device.

FIG. 24 shows an example of the screen 400 displayed on the display of the output device 4. When the user moves a hand in the vicinity of the object 332 supporting the left end of the billboard 330, the difference detecting section 118 detects a difference between frames. When the difference is detected in the vicinity of the object 332, the billboard control section 119 shakes the object 332. In a case of a large amount of difference, the billboard control section 119 drops the object 332. The billboard control section 119 displays a state in which the billboard 330 not supported at the left end hangs down. When a predetermined time has passed since the dropping of the object 332, the billboard control section 119 displays a process in which the object 332 returns to the original position and supports the left end of the billboard 330 again.

(Function of Horizontally Flipping Mirror Screen)

The game device 10 according to the embodiment provides a function of horizontally flipping the screen.

The image generating section 111 of the game device 10 generates the screen using a mirror image obtained by horizontally flipping the image imaged by the camera 7 in order to facilitate interaction of the user with the balloon, the billboard, characters, or the like displayed on the screen. However, in a case where the user desires to make the camera 7 image characters or the like and show the characters or the like to viewers when the user is distributing a moving image, the characters are flipped horizontally, and thus become difficult to read. Hence, for a case where a message for viewers or the like is imaged by the camera 7 and distributed to the viewers or the like, a function is provided which further horizontally flips the screen according to an instruction of the user as required, and thus distributes the screen generated using the original image imaged by the camera 7.

When the mirror image control section 120 receives an instruction to horizontally flip the display screen from the input device 6 or the mirror image instruction receiving section 217 of the portable terminal device 9, that is, an instruction to display the original image imaged by the camera 7 rather than the mirror image, the mirror image control section 120 instructs the image generating section 111 to horizontally flip the display screen. When the image generating section 111 receives the instruction to horizontally flip the display screen from the mirror image control section 120, the image generating section 111 horizontally flips the screen by generating the screen using the original image imaged by the camera 7.

When the mirror image control section 120 receives the instruction to horizontally flip the display screen, the mirror image control section 120 may horizontally flip both of the screen displayed on the display of the output device 4 viewed by the user himself/herself distributing the moving image and the screen of the moving image distributed via the distributing server 5, or may flip only one of the screens. In the case where the screen displayed on the display of the output device 4 is flipped horizontally, the face detecting section 115, the controller detecting section 117, and the difference detecting section 118 may horizontally flip the image imaged by the camera 7 which image is used to detect faces, input devices 6, and a difference between frames, or may not horizontally flip the image imaged by the camera 7. In the case where the image imaged by the camera 7 is flipped horizontally, correspondence relations between positions in which the faces, the input devices 6, and the difference are detected and the screen are maintained. Thus, the mask, the balloon, the billboard, and the like can be displayed without causing a feeling of strangeness. In the case where the image imaged by the camera 7 is not flipped horizontally, the positions in which the faces, the input devices 6, and the difference are detected do not correspond to the positions on the screen. However, the positions in which the faces, the input devices 6, and the difference are detected do not discontinuously jump from the positions before the screen is flipped horizontally. Thus, interaction can be continued smoothly. In addition, a novel enjoyment can be provided in that the positions in which the faces, the input devices 6, and the difference are detected do not correspond to the positions on the screen. When the display screen is flipped horizontally, only the imaged image may be flipped horizontally, and the characters, the balloon, the billboard, or the like displayed in a state of being superimposed on the imaged image may not be flipped horizontally. Alternatively, both of the imaged image and the characters, the balloon, the billboard, or the like may be flipped horizontally. In the former case, the characters displayed on the billboard or the like can be made easy to read. In the latter case, it can be clearly shown also to the viewers that the display screen is flipped horizontally. Incidentally, in the latter case, an object such as the balloon, the billboard, or the like may be flipped horizontally, and a texture including the characters or the like which texture is pasted to the object may not be flipped horizontally. It is thereby possible to make the characters or the like easy to read while clearly showing also to the viewers that the display screen is flipped horizontally.

(Voting Function)

The game device 10 according to the embodiment provides a function of receiving an instruction to conduct a questionnaire to viewers from the user distributing the moving image, and receiving votes in response to the questionnaire from other users viewing the distributed moving image.

While a display image is distributed by the distribution control section 113, the voting control section 121 of the game device 10 receives, from viewers, answers to a questionnaire about evaluation of the moving image being distributed. The voting control section 121 can receive, from viewers, answers to not only this default questionnaire that allows answers to be received at all times but also a questionnaire uniquely set by the user.

When the voting instruction receiving section 218 of the portable terminal device 9 receives an instruction to conduct a questionnaire to viewers via the menu screen displayed by the menu display section 213 while the user is distributing the moving image, the voting instruction receiving section 218 displays a screen for receiving the question of the questionnaire and alternatives as answers to the questionnaire from the user on the display device 263, and receives the question of the questionnaire and the alternatives as answers from the user. The number of alternatives as answers to the questionnaire may be a predetermined number. For example, the number of alternatives as answers to the questionnaire may be four, which is the number of operating buttons 76 of the input device 6. The voting instruction receiving section 218 transmits the received question of the questionnaire and the received alternatives as answers to the game device 10. The voting instruction receiving section 218 may store the received question of the questionnaire and the received alternatives as answers in the data retaining section 260, and read the question of the questionnaire and the alternatives as answers from the data retaining section 260 and transmit the question of the questionnaire and the alternatives as answers to the game device 10 when the user gives an instruction to conduct the questionnaire stored in the data retaining section 260.

The voting control section 121 of the game device 10 displays a billboard displaying the item of the questionnaire received from the portable terminal device 9 on the screen distributed to other users. The viewers can thereby realize that the questionnaire is being conducted by the user. The voting control section 121 may include a user interface for receiving votes in response to the questionnaire from viewers on the screen distributed to the other users. This user interface may be implemented by a script executable by a portable terminal device 9, a game device 10, or a browser included in a personal computer used for a viewer to view the moving image. The user interface may be provided as a standard function in service distributing the moving image from the game device 10. When the user interface receives votes in response to the questionnaire from the viewers, the user interface transmits a result of the received votes to the game device 10 directly or to the game device 10 via the distributing server 5.

When the voting control section 121 obtains the result of the votes by the viewers from the terminals of the viewers or the distributing server 5, the voting control section 121 stores the result of the votes in the data retaining section 160. When the voting instruction receiving section 218 of the portable terminal device 9 requests the voting control section 121 to obtain an interim result while the questionnaire is being conducted, the voting control section 121 reads the result of the votes from the data retaining section 160, and transmits the result of the votes to the portable terminal device 9. The voting instruction receiving section 218 displays the interim result of the votes which result is obtained from the game device 10 on the display device 263. Incidentally, the interim result of the votes is not displayed on the screen generated by the image generating section 111. Thus, the user viewing the display of the output device 4 and the users viewing the moving image distributed from the distributing server 5 cannot view the interim result, but only the user who prepared the questionnaire and uses the portable terminal device 9 can view the interim result.

When the user instructs the voting instruction receiving section 218 to end the questionnaire, the voting instruction receiving section 218 transmits the received instruction to the game device 10. When the voting control section 121 receives the instruction to end the questionnaire, the voting control section 121 erases the displayed item of the questionnaire from the screen.

When the user instructs the voting instruction receiving section 218 to distribute the result of the questionnaire, the voting instruction receiving section 218 transmits the received instruction to the game device 10. When the voting control section 121 receives the instruction to distribute the result of the questionnaire, the voting control section 121 reads the result of the questionnaire from the data retaining section 160, and displays the result of the questionnaire on the screen generated by the image generating section 111. Thus, a particular display object, for example, information on the answers to the questionnaire which answers are received by the game device 10 from the other users viewing the moving image distributed from the distribution control section 113 can be displayed in arbitrary timing on the portable terminal device 9 of the user who requested the questionnaire to be conducted, but is not displayed in the distribution image unless the disclosure instruction is given from the portable terminal device 9 of the user. Hence, the user can privately collect the information from the viewers during the distribution of the moving image, and can display and disclose the information in the distribution image if necessary.

Figure 25:
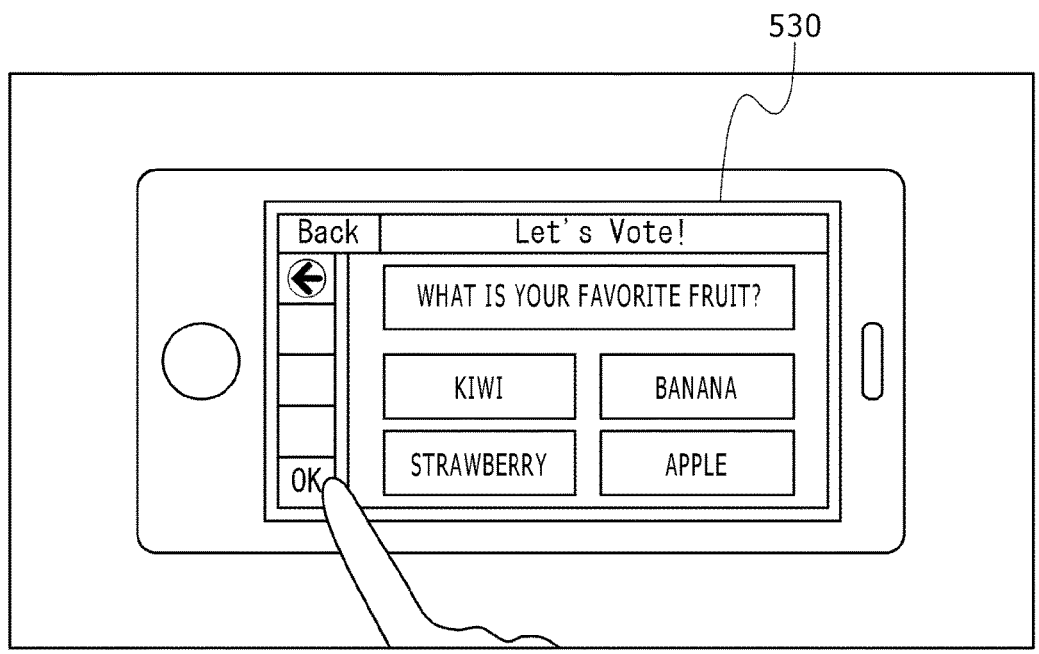
FIG. 25 is a diagram showing an example of the screen displayed on the display device of the portable terminal device.

FIG. 25 shows an example of the screen displayed on the display device 263 of the portable terminal device 9. The voting instruction receiving section 218 of the portable terminal device 9 displays a screen 530 for receiving an item of a questionnaire from the user on the display device 263. The user sets an item of a questionnaire on the screen 530. The voting instruction receiving section 218 transmits the received item of the questionnaire to the game device 10.

Figure 26:
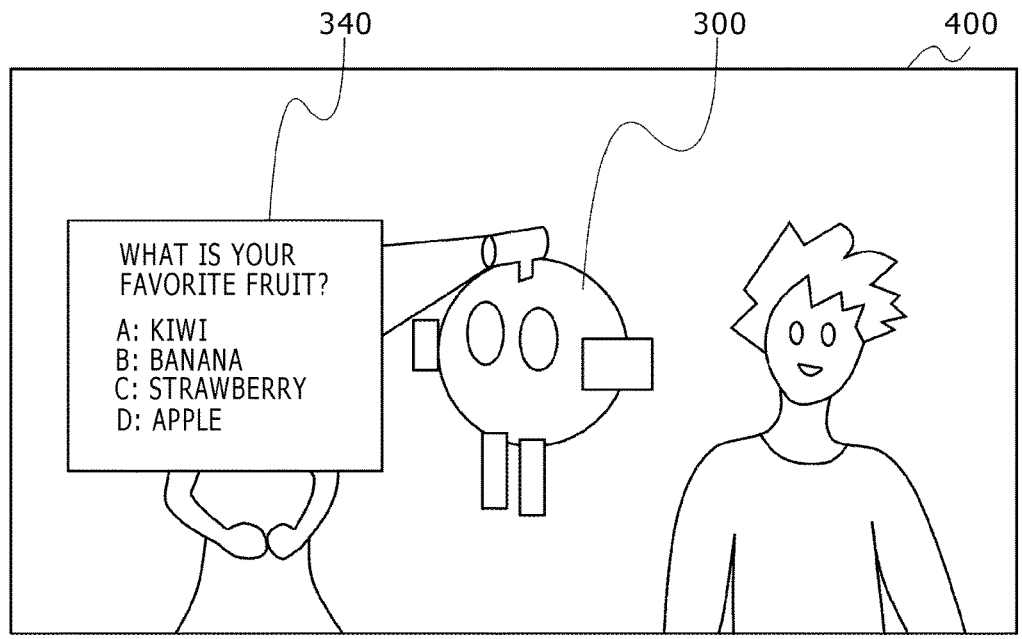
FIG. 26 is a diagram showing an example of the screen displayed on the display of the output device.

FIG. 26 shows an example of the screen 400 displayed on the display of the output device 4. When the voting control section 121 of the game device 10 obtains the item of the questionnaire from the portable terminal device 9, the voting control section 121 displays a state in which the character 300 displays a questionnaire 340 as a hologram.

Figure 27:
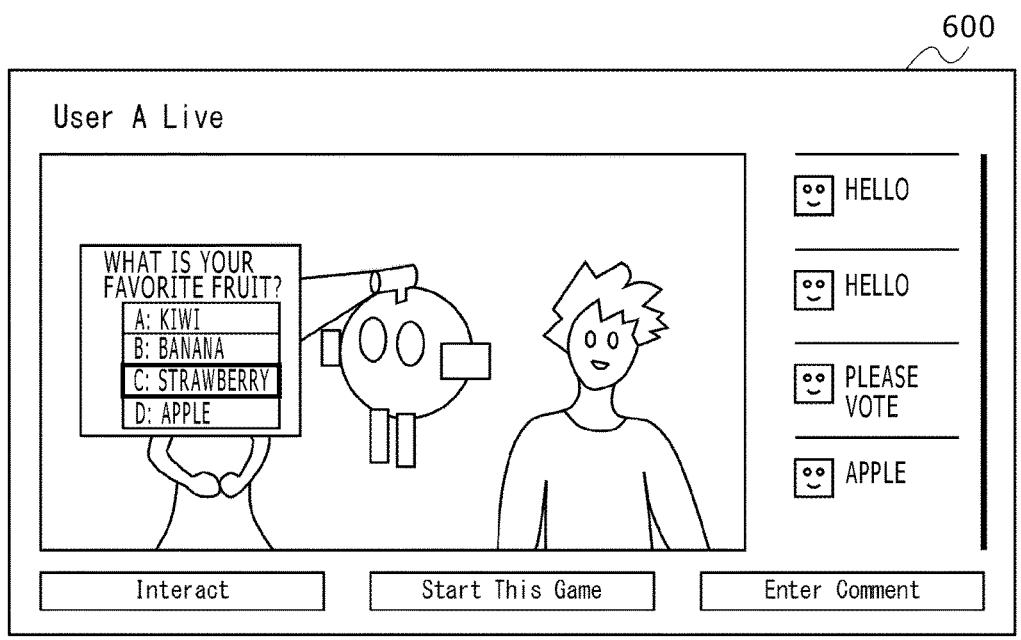
FIG. 27 is a diagram showing an example of a screen displayed on a display device of a terminal of a user viewing a moving image distributed by a distributing server.

FIG. 27 shows an example of a screen 600 displayed on a display device of a terminal of a user viewing the moving image distributed by the distributing server 5. The screen 600 is provided with a user interface for responding to the questionnaire. The user can vote in the questionnaire via the interface.

Figure 28:
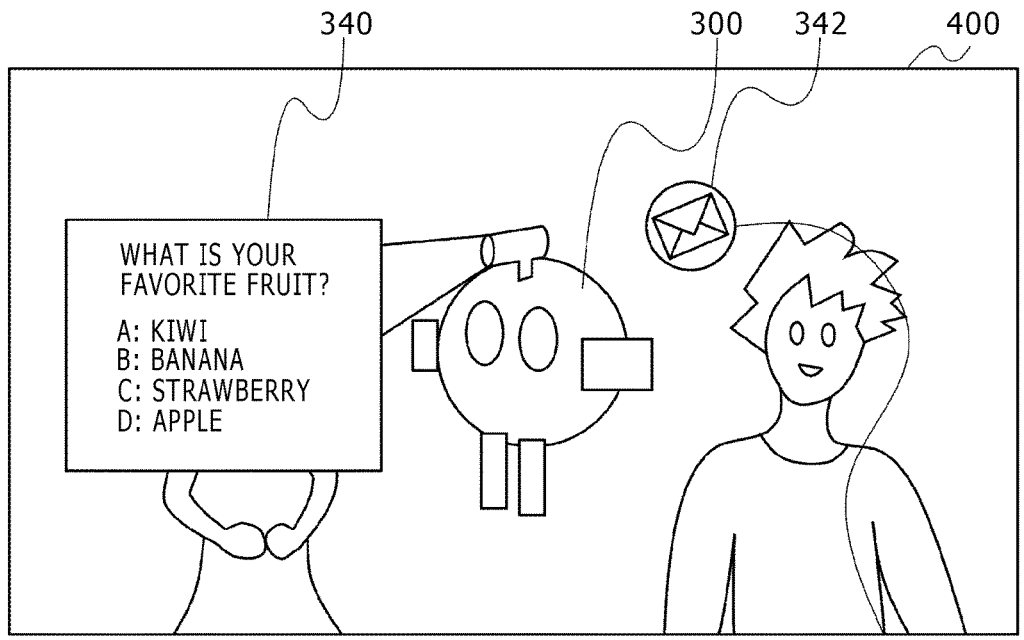
FIG. 28 is a diagram showing an example of the screen displayed on the display of the output device.

FIG. 28 shows an example of the screen 400 displayed on the display of the output device 4. When the voting control section 121 obtains the vote in response to the questionnaire from the user viewing the moving image being distributed, the voting control section 121 displays an icon 342 indicating that the vote in response to the questionnaire is obtained on the screen 400.

Figure 29:
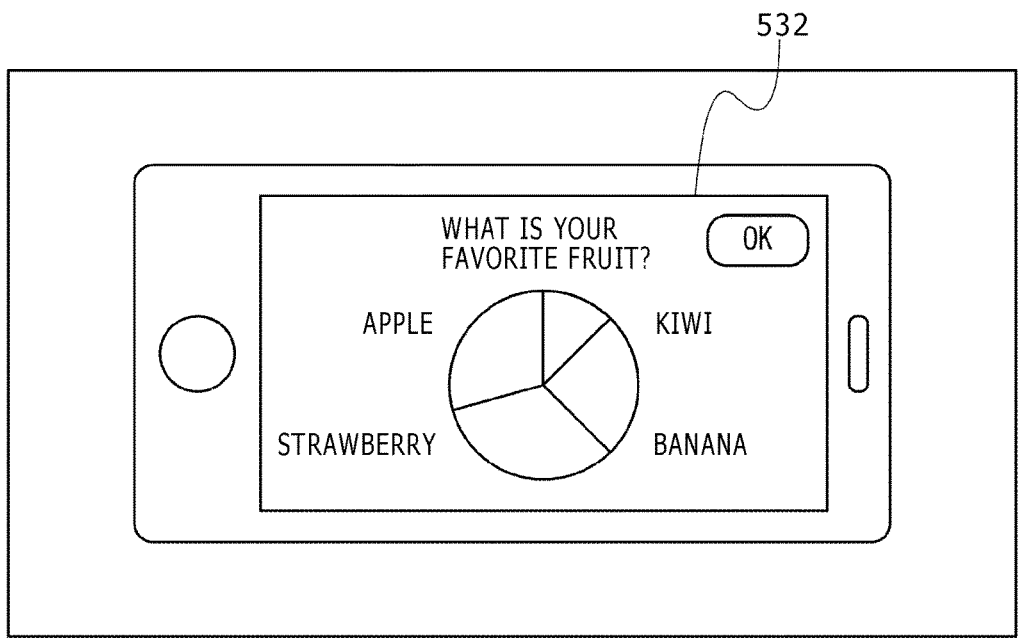
FIG. 29 is a diagram showing an example of the screen displayed on the display device of the portable terminal device.

FIG. 29 shows an example of the screen displayed on the display device 263 of the portable terminal device 9. When the voting instruction receiving section 218 receives an instruction to obtain an interim result of the questionnaire from the user, the voting instruction receiving section 218 transmits the received instruction to the game device 10. When the voting control section 121 receives the instruction to obtain the interim result of the questionnaire from the portable terminal device 9 that requested the questionnaire to be conducted, the voting control section 121 reads a result of the questionnaire from the data retaining section 160, and transmits the result of the questionnaire to the portable terminal device 9. The voting instruction receiving section 218 displays a screen 532 showing the interim result of the questionnaire on the display device 263. This screen 532 is displayed on only the display device 263 of the portable terminal device 9 that requested the questionnaire to be conducted, and is not displayed on the screen distributed from the distribution control section 113. That is, the user who requested the questionnaire to be conducted can check the interim result without disclosing the result of the questionnaire to viewers.

Figure 30:
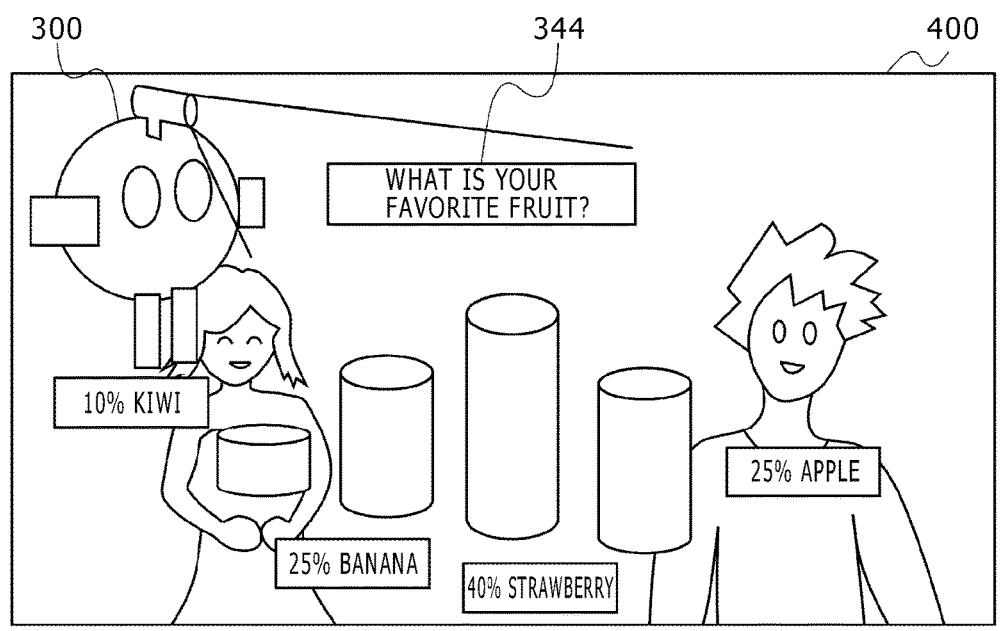
FIG. 30 is a diagram showing an example of the screen displayed on the display of the output device.

FIG. 30 shows an example of the screen 400 displayed on the display of the output device 4. When the voting instruction receiving section 218 receives an instruction to distribute the result of the questionnaire from the user, the voting instruction receiving section 218 transmits the received instruction to the game device 10. When the voting control section 121 receives the instruction to distribute the result of the questionnaire from the portable terminal device 9 that requested the questionnaire to be conducted, the voting control section 121 reads the result of the questionnaire from the data retaining section 160, and displays an aggregate result 344 of the questionnaire on the screen 400. The screen 400 displaying the result 344 of the questionnaire is also distributed to users viewing the moving image.

Figure 31:
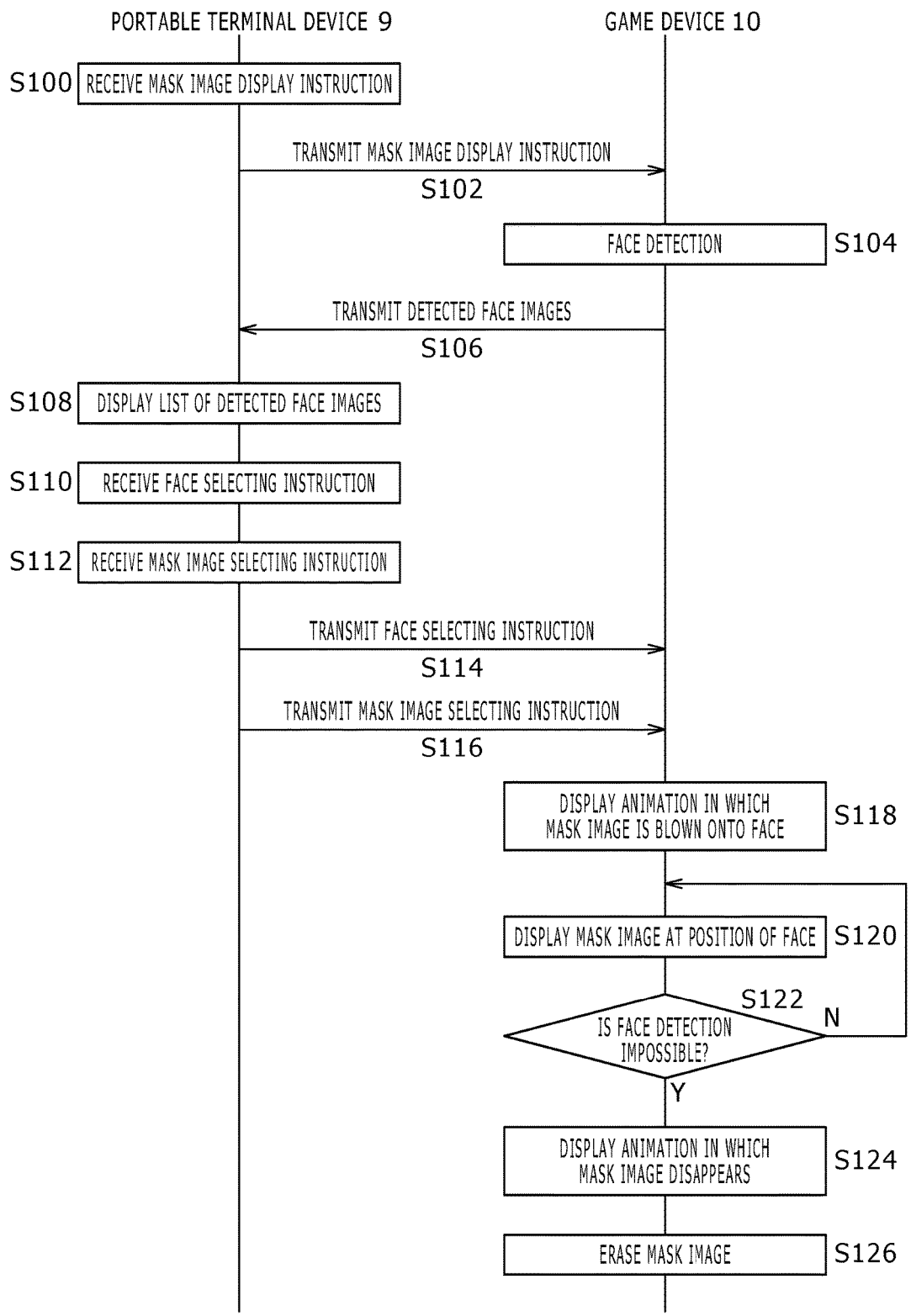
FIG. 31 is a flowchart showing a procedure of a game control method according to the embodiment.

FIG. 31 is a flowchart showing a procedure of a game control method according to the embodiment. When the mask instruction receiving section 214 of the portable terminal device 9 receives an instruction to display a mask image from the user (S100), the mask instruction receiving section 214 transmits the received instruction to the game device 10 (S102). When the mask control section 114 of the game device 10 receives the instruction to display a mask image from the portable terminal device 9, the mask control section 114 makes the face detecting section 115 detect faces included in an image imaged by the camera 7 (S104), and transmits detected face images to the portable terminal device 9 (S106).

In order to receive, from the user, an instruction to select a user having a face on which to display a mask, the mask instruction receiving section 214 displays a list of the face images transmitted from the game device 10 on the display device 263 (S108). The mask instruction receiving section 214 receives an instruction to select a face on which to display a mask image (S110) and an instruction to select the mask image to be displayed (S112) from the user. The mask instruction receiving section 214 transmits the received instruction to select the face (S114) and the received instruction to select the mask image (S116) to the game device 10.

When the mask control section 114 obtains the instructions to select the face on which to display the mask and the mask image from the portable terminal device 9, the mask control section 114 displays a state in which the character blows the material of the mask onto the face (S118). After an end of the animation display, the mask control section 114 displays the mask image at the position of the face detected by the face detecting section 115 (S120). While the face detecting section 115 can detect the face of the user (N in S122), the mask control section 114 displays the mask image in a state of being superimposed on the position of the detected face (S120). When the face detecting section 115 becomes unable to detect the face of the user because the user has hidden the face by covering the face by hand, for example, (Y in S122), the mask control section 114 makes an animation display of a process in which the displayed mask 312 disappears (S124). After an end of the animation display, the mask control section 114 erases the mask image (S126).

Figure 32:
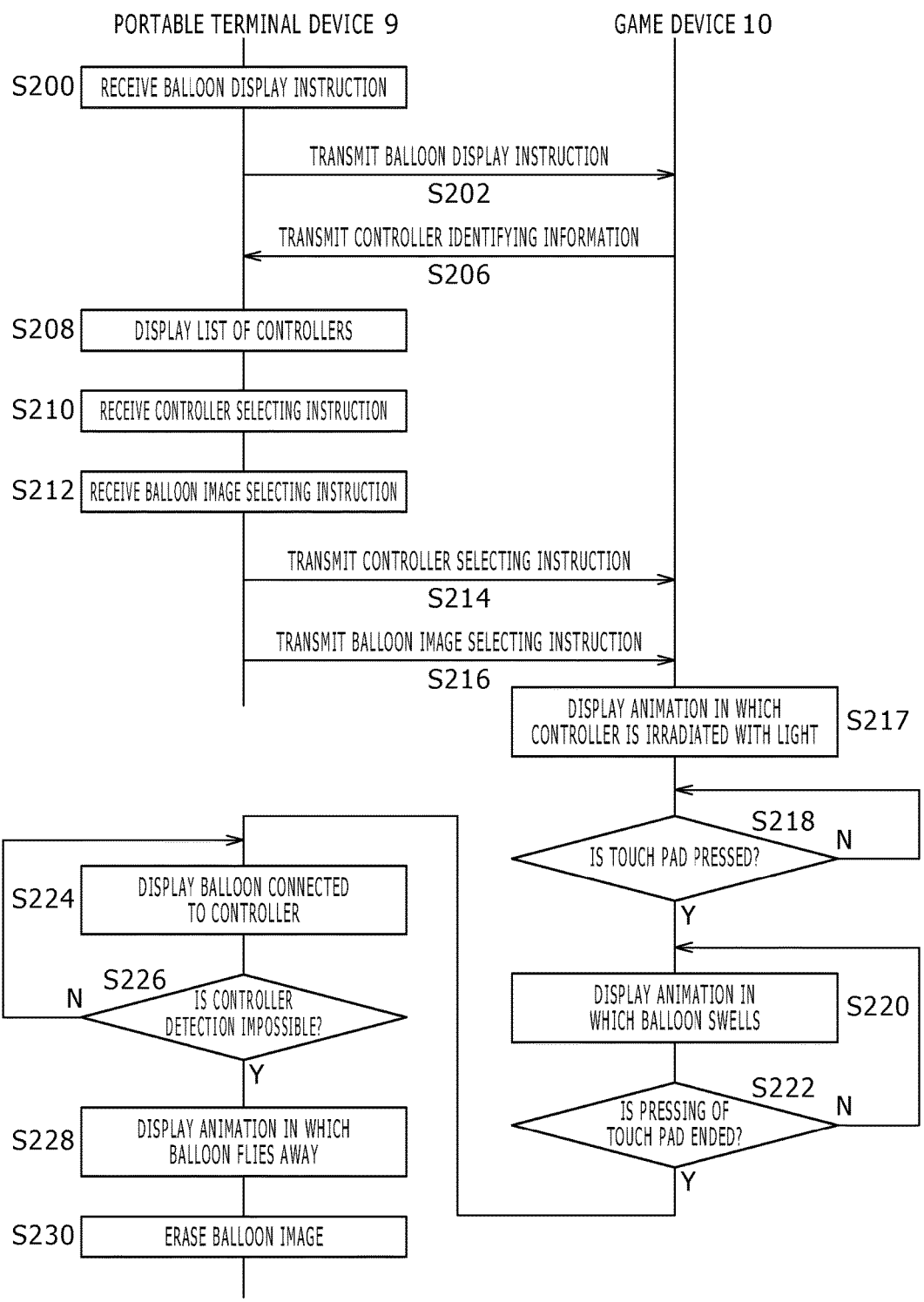
FIG. 32 is a flowchart showing a procedure of the game control method according to the embodiment.

FIG. 32 is a flowchart showing a procedure of the game control method according to the embodiment. When the balloon instruction receiving section 215 of the portable terminal device 9 receives an instruction to display a balloon from the user (S200), the balloon instruction receiving section 215 transmits the received instruction to the game device 10 (S202). When the balloon control section 116 of the game device 10 receives the instruction to display a balloon from the portable terminal device 9, the balloon control section 116 transmits identifying information of active input devices 6 to the portable terminal device 9 (S206).

The balloon instruction receiving section 215 displays a list of the active input devices 6 transmitted from the game device 10 on the display device 263 (S208). The balloon instruction receiving section 215 receives, from the user, an instruction to select an input device 6 to which to assign the balloon display (S210) and an instruction to select a balloon image to be displayed (S212). The balloon instruction receiving section 215 transmits the received instruction to select the input device 6 (S214) and the received instruction to select the balloon image (S216) to the game device 10.

When the balloon control section 116 obtains the instructions to select the input device 6 and the balloon image from the portable terminal device 9, the balloon control section 116 makes an animation display of a state in which the character irradiates the input device 6 with light (S217). The balloon control section 116 waits until the touch pad 79 of the input device 6 to which the balloon display is assigned is pressed (N in S218). When the touch pad 79 is pressed (Y in S218), the balloon control section 116 displays a process in which the balloon image assigned to the input device 6 swells from the position of the input device 6 (S220) until an end of the pressing of the touch pad 79 (N in S222). After an end of the pressing of the touch pad 79 (Y in S222), while the controller detecting section 117 is able to detect the position of the input device 6 (N in S226), the balloon control section 116 displays a state in which the balloon is connected to the input device 6 (S224). When the controller detecting section 117 becomes unable to detect the position of the input device 6 because the user has covered and hidden the light emitting portion 85 of the input device 6 by hand or the like (Y in S226), the balloon control section 116 makes an animation display of a process in which a string connecting the balloon to the input device 6 is broken and the balloon flies away (S228). After an end of the animation display, the balloon control section 116 erases the balloon (S230).

Figure 33:
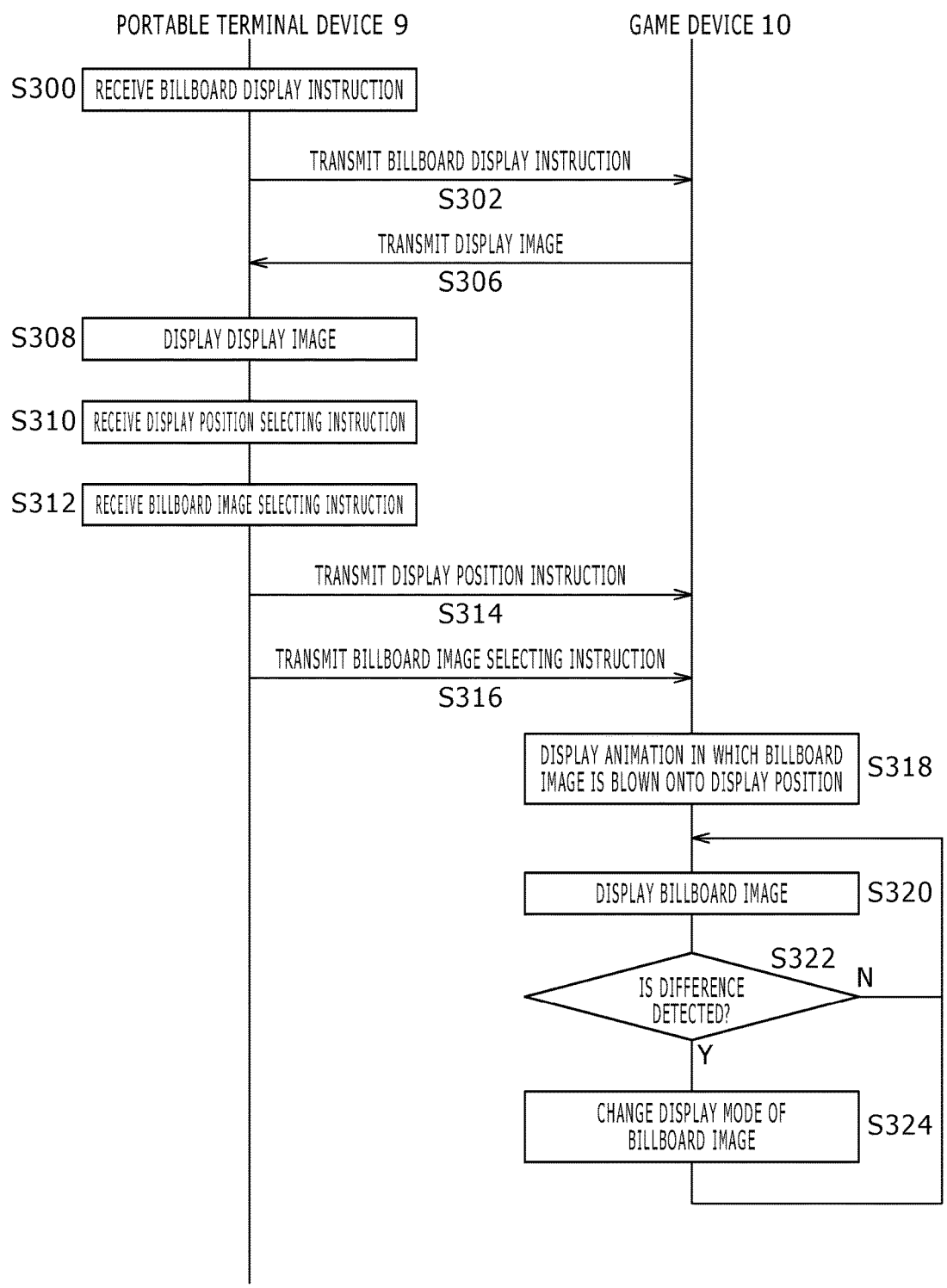
FIG. 33 is a flowchart showing a procedure of the game control method according to the embodiment.

FIG. 33 is a flowchart showing a procedure of the game control method according to the embodiment. When the billboard instruction receiving section 216 of the portable terminal device 9 receives an instruction to display a billboard from the user (S300), the billboard instruction receiving section 216 transmits the received instruction to the game device 10 (S302). When the billboard control section 119 of the game device 10 receives the instruction to display a billboard from the portable terminal device 9, the billboard control section 119 transmits a display image generated by the image generating section 111 and displayed on the output device 4 to the portable terminal device 9 (S306).

The billboard instruction receiving section 216 displays the display image transmitted from the game device 10 on the display device 263 (S308). The billboard instruction receiving section 216 receives an instruction to select a position in which to display a billboard (S310) and an instruction to select an image to be displayed as the billboard (S312) from the user. The billboard instruction receiving section 216 transmits the received instruction to select the display position (S314) and the received instruction to select the billboard image (S316) to the game device 10.

When the billboard control section 119 obtains the instructions to select the display position of the billboard and the image to be displayed as the billboard from the portable terminal device 9, the billboard control section 119 makes an animation display of a state in which the material of the billboard image is blown onto the display position (S318). After an end of the animation display, the billboard control section 119 displays the billboard image in the display position (S320). When the difference detecting section 118 detects a difference in the vicinity of the region in which the billboard is displayed (Y in S322), the billboard control section 119 changes the display mode of the billboard according to the detected difference (S324). When no difference is detected (N in S322), the billboard image is displayed as it is (S320).

Figure 34:
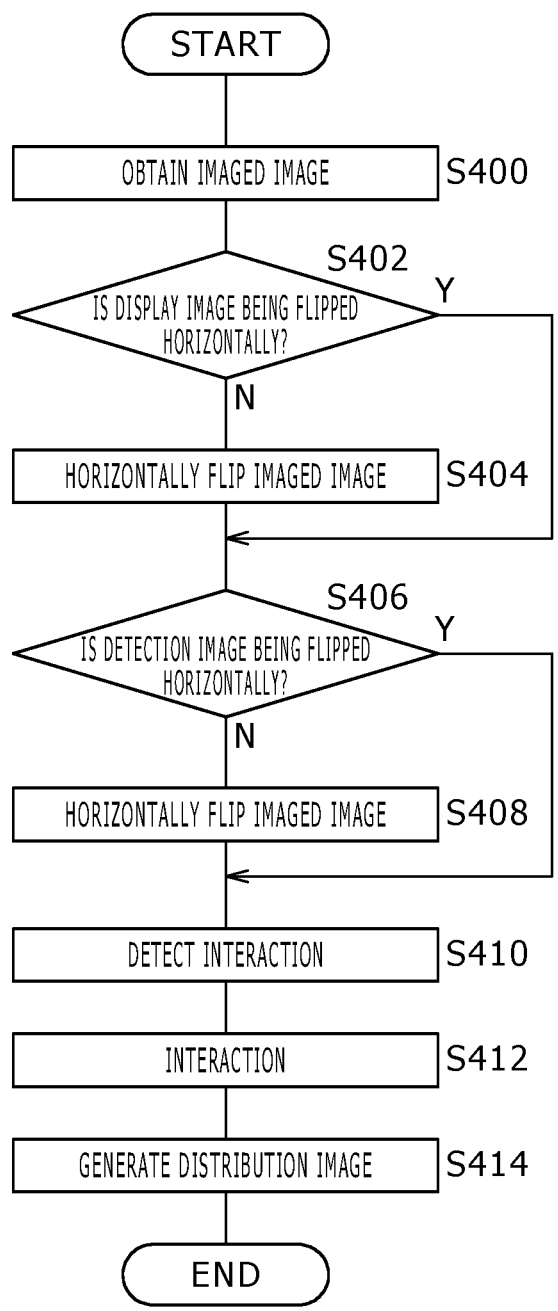
FIG. 34 is a flowchart showing a procedure of the game control method according to the embodiment.

FIG. 34 is a flowchart showing a procedure of the game control method according to the embodiment. The game device 10 obtains an imaged image from the camera 7 (S400). When the mirror image control section 120 does not receive an instruction to horizontally flip the display image (N in S402), the mirror image control section 120 generates a mirror image, which is obtained by horizontally flipping the imaged image, and makes the display image generated on the basis of the mirror image (S404). When the instruction to horizontally flip the display image is received (Y in S402), S404 is skipped, and the display image horizontally flipped from the normal display image is generated by not horizontally flipping the imaged image.

When the mirror image control section 120 does not receive an instruction to horizontally flip a detection image used for the difference detecting section 118 to detect a difference between frames (N in S406), the mirror image control section 120 generates the detection image by horizontally flipping the imaged image, and makes a difference detected on the basis of the generated detection image (S408). When the instruction to horizontally flip the detection image is received (Y in S406), S408 is skipped, and a difference is made to be detected on the basis of the detection image horizontally flipped from the normal detection image by not horizontally flipping the imaged image.

The difference detecting section 118 detects a difference between frames on the basis of the detection image flipped horizontally or not flipped horizontally to detect interaction between the user in the imaged real world or the like and an object such as a character, a balloon, a billboard, or the like in the displayed virtual world (S410). The balloon control section 116 and the billboard control section 119 control the balloon and the billboard according to the detected interaction (S412). The image generating section 111 generates a distribution image including the balloon and the billboard made to interact (S414).

Figure 35:
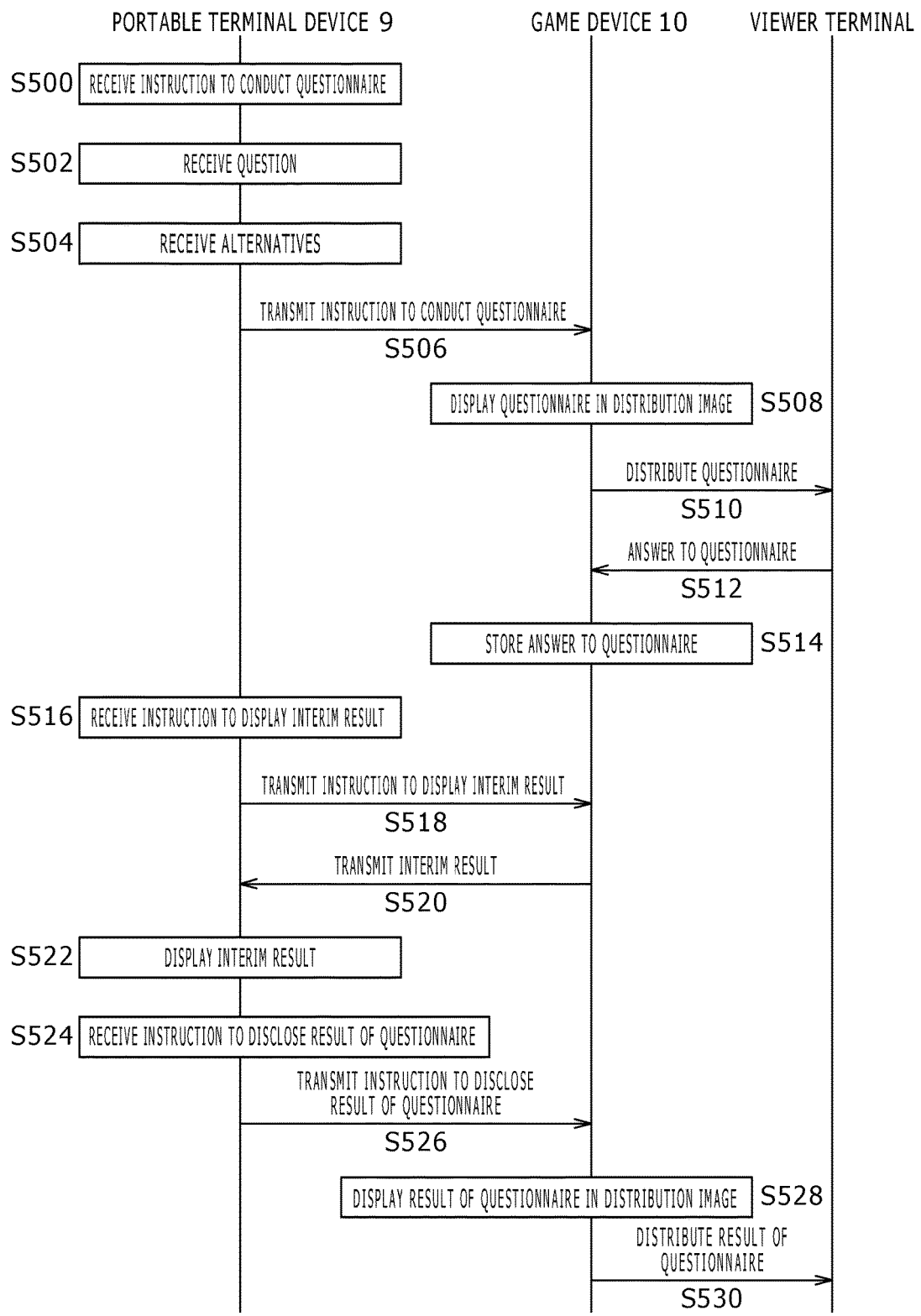
FIG. 35 is a flowchart showing a procedure of the game control method according to the embodiment.

FIG. 35 is a flowchart showing a procedure of the game control method according to the embodiment. When the voting instruction receiving section 218 of the portable terminal device 9 receives an instruction to conduct a questionnaire from the user (S500), the voting instruction receiving section 218 further receives a question of the questionnaire (S502) and alternatives as answers to the question (S504) from the user. The voting instruction receiving section 218 transmits the instruction to conduct the questionnaire to the game device 10 together with the received question and the received answer alternatives (S506).

When the voting control section 121 obtains the instruction to conduct the questionnaire from the portable terminal device 9, the voting control section 121 displays the question of the questionnaire and the answer alternatives in the distribution image to be distributed by the image generating section 111 (S508). The distribution image in which the questionnaire is displayed is transmitted to the terminal of a viewer from the distribution control section 113 via the distributing server 5 or the like (S510). The viewer makes an answer to the questionnaire (S512). When the voting control section 121 obtains the answer to the questionnaire from the terminal of the viewer, the voting control section 121 stores the obtained answer in the data retaining section 160 (S514). At this time, the voting control section 121 displays, in the distribution image, an icon or the like indicating that the answer to the questionnaire is obtained.

When the voting instruction receiving section 218 receives an instruction to obtain an interim result of the questionnaire from the user (S516), the voting instruction receiving section 218 transmits the received instruction to the game device 10 (S518). When the voting control section 121 receives the instruction to obtain an interim result of the questionnaire from the portable terminal device 9 that requested the questionnaire to be conducted, the voting control section 121 reads a result of the questionnaire from the data retaining section 160, and transmits the result of the questionnaire to the portable terminal device 9 (S520). The voting instruction receiving section 218 displays a screen showing the interim result of the questionnaire on the display device 263 (S522).

When the voting instruction receiving section 218 receives an instruction to disclose a result of the questionnaire from the user (S524), the voting instruction receiving section 218 transmits the received instruction to the game device 10 (S526). When the voting control section 121 receives the instruction to distribute the result of the questionnaire from the portable terminal device 9 that requested the questionnaire to be conducted, the voting control section 121 reads the result of the questionnaire from the data retaining section 160, and displays the aggregate result of the questionnaire in the distribution image (S528). The distribution image in which the result of the questionnaire is displayed is distributed to the terminal of the viewer (S530).

Incidentally, the distribution image distributed from the distribution control section 113 to other devices and the display image displayed on the display of the output device 4 may be the same, or may be different from each other. For example, the mask, the balloon, the billboard, the result of the questionnaire, and the like described above may be displayed in only the distribution image, may be displayed in only the display image, or may be displayed in both.

The present invention has been described above on the basis of an embodiment thereof. The present embodiment is illustrative, and it is to be understood by those skilled in the art that combinations of constituent elements and processing processes of the embodiment are susceptible of various modifications and that such modifications also fall within the scope of the present invention.

REFERENCE SIGNS LIST

4 Output device, 5 Distributing server, 6 Input device, 7 Camera, 9 Portable terminal device, 10 Game device, 110 Control section, 113 Distribution control section, 114 Mask control section, 115 Face detecting section, 116 Balloon control section, 117 Controller detecting section, 118 Difference detecting section, 119 Billboard control section, 120 Mirror image control section, 121 Voting control section, 160 Data retaining section, 210 Control section, 214 Mask instruction receiving section, 215 Balloon instruction receiving section, 216 Billboard instruction receiving section, 217 Mirror image instruction receiving section, 218 Voting instruction receiving section, 260 Data retaining section.

INDUSTRIAL APPLICABILITY

The present invention is applicable to image processing devices processing an imaged image.

The invention claimed is:
1. An image processing device comprising:
   a detecting section configured to obtain an image of a player's actual environment imaged by an imaging device, and detect a player's face included in the obtained image, wherein a group of imaged player faces is transmitted to a portable device of a user who is prompted to select one of the player faces and a virtual mask to display over the selected player face;
   a control section configured to calculate a position in which to display the virtual mask according to a position in which the selected player face is detected; and
   a generating section configured to:
      generate a display image displaying the virtual mask in the position calculated by the control section in the obtained image such that the virtual mask is superimposed on the selected player's face and is synchronized with the selected player's facial movements and expressions, and
      display the generated display image on a display device, wherein said mask is displayed in accordance with a size and orientation of the selected player's face and reflects the facial expressions of the selected player's face, wherein:
   the detecting section further detects an angle of rotation of an orientation of the selected player's face, and
   the control section makes the generating section produce a display image that includes the image of the virtual mask rotated by a larger angle of rotation than the angle of rotation of the selected player's face detected by the detecting section.

2. The image processing device according to claim 1, wherein the virtual mask includes a first part displayed in the position calculated by the control section according to the position in which the selected player's face is detected, the first part being displayed so as to follow movement of the selected player's face, and a second part moved by the control section so as to be dependent on movement of the first part.

3. The image processing device according to claim 2, wherein the control section separates the second part from the first part when the detecting section becomes unable to detect the selected player's face.

4. The image processing device according to claim 1, wherein the control section erases the virtual mask from the display image when the detecting section becomes unable to detect the selected player's face.

5. A non-transitory, computer readable storage medium containing a computer image processing program, which when executed by a computer, causes the computer to carry out actions, comprising:
   obtaining an image of a player's actual environment using an imaging device, and detecting a player's face included in the obtained image, wherein a list of imaged player faces is transmitted to a portable device of a user who is prompted to select one of the player faces and a virtual mask to display over the selected player face;
   calculating a position in which to display the virtual mask according to a position in which the player's face is detected; and
   generating a display image displaying the virtual mask in the position calculated in the obtained image such that the virtual mask is superimposed on the selected player's face and is synchronized with the selected player's facial movements and expressions, and displaying the generated display image on a display device,
   wherein said mask is displayed in accordance with a size and orientation of the selected player's face and reflects the facial expressions of the selected player's face,
   wherein the detecting further detects an angle of rotation of an orientation of the selected player's face, and
   wherein calculating includes making the generating produce the display image to include the image of the virtual mask rotated by a larger angle of rotation than the angle of rotation of the selected player's face detected.

6. An image processing method comprising:
   obtaining an image of a player's actual environment using an imaging device, and detecting a player's face included in the obtained image, wherein a list of imaged player faces is transmitted to a portable device of a user who is prompted to select one of the player faces and a virtual mask to display over the selected player face;
   calculating a position in which to display the virtual mask according to a position in which the player's face is detected; and
   generating a display image displaying the virtual mask in the position calculated in the obtained image such that the virtual mask is superimposed on the selected player's face and is synchronized with the selected player's facial movements and expressions, and displaying the generated display image on a display device,
   wherein said mask is displayed in accordance with a size and orientation of the selected player's face and reflects the facial expressions of the selected player's face,
   wherein the detecting further detects an angle of rotation of an orientation of the selected player's face, and
   wherein calculating includes making the generating produce the display image to include the image of the virtual mask rotated by a larger angle of rotation than the angle of rotation of the selected player's face detected.

7. The image processing device of claim 1, wherein the portable device displays a drawing screen for the user to draw the virtual mask on the display device.

8. The image processing device of claim 1, wherein an angle of rotation of the virtual mask is determined by: 1) identifying a straight line connecting a position of a player's face to a position of a camera is set as a reference, and 2) obtaining an angle of rotation of the player's face about said line, and 3) increasing the obtained angle of rotation by a predetermined amount of degrees, thereby emphasizing rotation of the virtual mask relative to the actual rotation of the player's face.

9. The image processing device of claim 8, wherein an increase in the obtained angle of rotation of the selected player's face causes a greater increase in the angle of rotation of the virtual mask.

* * * * *